United States Patent [19]
Ochiai et al.

[11] Patent Number: 6,119,357
[45] Date of Patent: Sep. 19, 2000

[54] SCALE DEVICE

[75] Inventors: Osamu Ochiai; Ken Onoe, both of Kanagawa, Japan

[73] Assignee: Sony Precision Technology, Inc., Tokyo, Japan

[21] Appl. No.: 09/080,953

[22] Filed: May 19, 1998

[30] Foreign Application Priority Data

May 28, 1997 [JP] Japan ..................................... 9-138659
Jun. 9, 1997 [JP] Japan ..................................... 9-151076

[51] Int. Cl.[7] .............................. A45B 3/08; H03M 1/22; G01B 7/14
[52] U.S. Cl. ......................... 33/708; 341/15; 324/207.21; 324/207.24
[58] Field of Search ............................ 33/706, 707, 708; 341/15; 324/207.21, 207.24

[56] References Cited

U.S. PATENT DOCUMENTS

| | | | |
|---|---|---|---|
| 4,663,853 | 5/1987 | Indo et al. ................................. | 33/708 |
| 4,982,508 | 1/1991 | Nelle et al. ............................... | 33/707 |
| 5,434,602 | 7/1995 | Kaburagi et al. .......................... | 341/15 |

*Primary Examiner*—Randy W. Gibson
*Attorney, Agent, or Firm*—Jay H. Maioli

[57] ABSTRACT

A scale device 1 includes a base unit 2 comprised of an elongated casing 3 wherein an elongated thin-plate-like scale 4 is secured with the a mid portion of the thin-plate-like scale 4 kept in a floating state and a slider unit 10 slidable relative to the base unit 2. The slider unit 10 has a sensor 15 for detecting magnetic graduations recorded on the thin-plate-like scale 4. A reference sliding member 16 is provided for maintaining a constant separation between the sensor 15 and the recording surface of the magnetic graduations of the thin-plate-like scale 4. A pressing sliding member 17 is provided for pressing the reference sliding member 16 so that the recording surface of the magnetic graduations are perpetually contacted with the reference sliding member 16. A detection head unit 14 is movable telescopically relative to the thin-plate-like scale 4 in a direction along the width of the scale.

7 Claims, 22 Drawing Sheets

SCALE DEVICE

BACKGROUND OF THE INVENTION

1. Field of the Invention

This invention relates to a scale device used for detecting the position of a straight line in machine tools or in industrial machines by way of relative position detection.

2. Related Art

This type of the scale device is composed in general of a base unit, having a graduated scale secured to a base member, and a slider unit, mounted relatively slidably on this base unit and carrying a sensor adapted for detecting the graduations recorded on the scale.

In this type of the conventional scale device, a scale in the shape of a round rod is provided as the scale on the base unit side, and a detection head unit having a sensor for detecting the graduations is provided on the slide unit side. The above-described scale is slidably inserted in an opening in the detection head unit. There is also provided a universal mechanism in the detection head unit to permit mounting tolerances and tolerances for component parts.

Among these scale devices, there is such a scale device employing a thin-sheet-like scale as the graduated scale.

The scale device, employing the thin-sheet-like scale, is combined with another member over the entire length, or uses an auxiliary cushioning member, for supporting the scale.

However, with the scale device of the structure in which the round-rod-like scale is inserted in the opening in the detection head unit, the telescopic movement of the detection head unit relative to the scale cannot be realized except from the end face side of the scale, thus worsening assembling and maintenance characteristics. Also, the detection head unit needs to be provided with a complicated universal mechanism in order to cope with position changes to allow for mounting and manufacturing tolerances, thus leading to increased cost.

If, in a scale device employing a thin-plate-like scale, the thin-plate-like scale has a temperature expansion coefficient different from that of the member supporting the thin-plate-like scale, the scale and the supporting member undergo differential deformation thus worsening measurement accuracy. Moreover, since separate members are used, the problem of increased cost is raised inevitably.

SUMMARY OF THE INVENTION

It is therefore an object of the present invention to provide a scale device which is low in manufacturing cost and excellent in reliability.

It is another object of the present invention to provide a scale device in which the detection head unit is telescopically mounted in the width-wise direction of the thin-plate-like scale.

It is yet another object of the present invention to provide a scale device capable of accommodating position changed without provision of a complex universal mechanism.

In one aspect, the present invention provides a scale device including a base unit having a scale carrying recorded graduations secured to a main base member, and a slider unit mounted for sliding relative to the base unit for detecting the graduations recorded on the scale, wherein the scale is formed as a thin plate which has its both ends secured to the main base member, a mid portion of the thin plate being in a floating state.

In the scale device according to the present invention, the thin-plate-like scale is secured by welding to the main base member.

In the scale device according to the present invention, the thin-plate-like scale is secured to the main base member by resistance-welding the thin-plate-like scale to a bracket.

In the scale device according to the present invention, the bracket is made up of a supporting plate portion to which is resistance-welded the thin-plate-like scale and legs formed by warping both ends of the thin-plate-like scale along its length, in which a warped portion of the leg lying towards the mid portion along the length of the thin-plate-like scale is curved so as to be progressively removed from the recording surface of the magnetic graduations of the thin-plate-like scale.

In the scale device according to the present invention, the thin-plate-like scale is secured in a tensioned state on the main base member.

In the scale device according to the present invention, the main base member has a U-shaped cross-section and wherein the thin-plate-like scale is secured to the main base member so that the recording surface of the magnetic graduations is substantially perpendicular to the open surface of the main base member.

In another aspect, the present invention provides a scale device including a base unit having a scale carrying recorded graduations secured to a main base member, and a slider unit mounted for sliding relative to the base unit for detecting the graduations recorded on the scale, wherein the scale is formed as a thin plate which has its both ends secured to the main base member, a mid portion of the thin plate is in a floating state, there is provided a detection head unit on the slider unit, the detection head unit has the above-described sensor, there is also provided a reference sliding member for maintaining a constant distance between the sensor and the graduated recording surface of the scale and there is further provided a pressing sliding member for pressing the reference sliding member so that the graduated recording surface of the scale will be perpetually contacted with the reference sliding member. The detection head unit is adapted for being telescopically moved relative to the scale in a direction along the width of the scale.

In yet another aspect, the present invention provides a scale device including a base unit having a scale carrying recorded graduations secured to a main base member, and a slider unit mounted for sliding relative to the base unit for detecting the graduations recorded on the scale, wherein the scale is formed as a thin plate which has its both ends secured to the main base member, a mid portion of the thin plate being in a floating state, there is provided a detection head unit on the slider unit, the detection head unit has the above-described sensor and there is also provided a sliding member having a groove for maintaining the distance between the sensor and the graduated recording surface of the scale within a range that allows for detection of graduations by the sensor. The detection head unit is adapted for being telescopically moved relative to the scale in a direction along the width of the scale.

DESCRIPTION OF PREFERRED EMBODIMENTS

Figure 1:
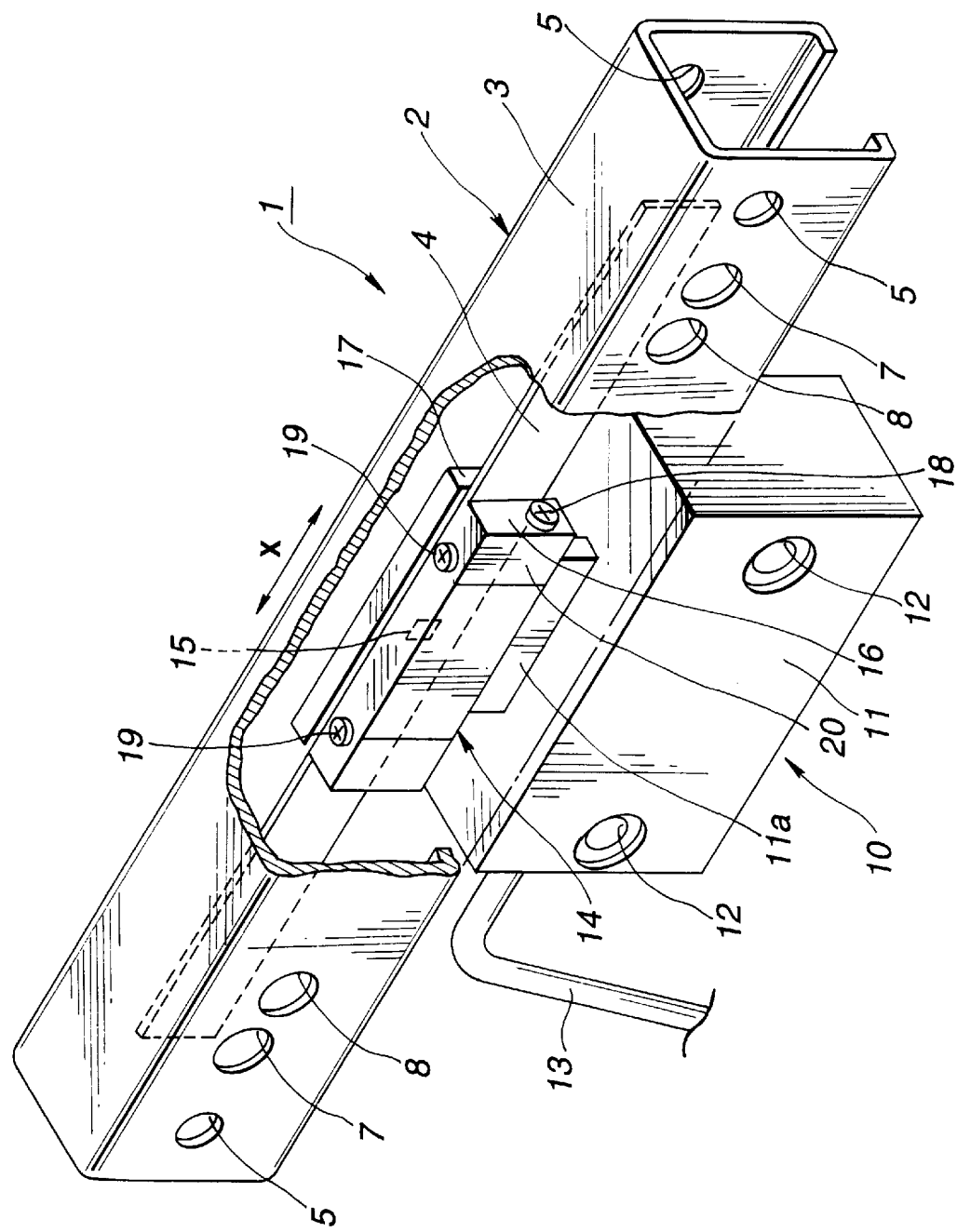
FIG. 1 is a perspective view showing a magnetic linear scale device embodying the present invention, with a portion of a casing cut away.

Referring to the drawings, preferred embodiments of the present invention will be explained in detail.

The present invention is applied to a magnetic linear scale device 1 configured as shown in FIGS. 1 to 18.

Referring to FIG. 1 showing the magnetic linear scale device 1 with a portion of a casing 3 cut away, the magnetic linear scale device 1 is made up of a base unit 2 and a slider unit 10 mounted for sliding relative to the base unit 2.

Figure 2:
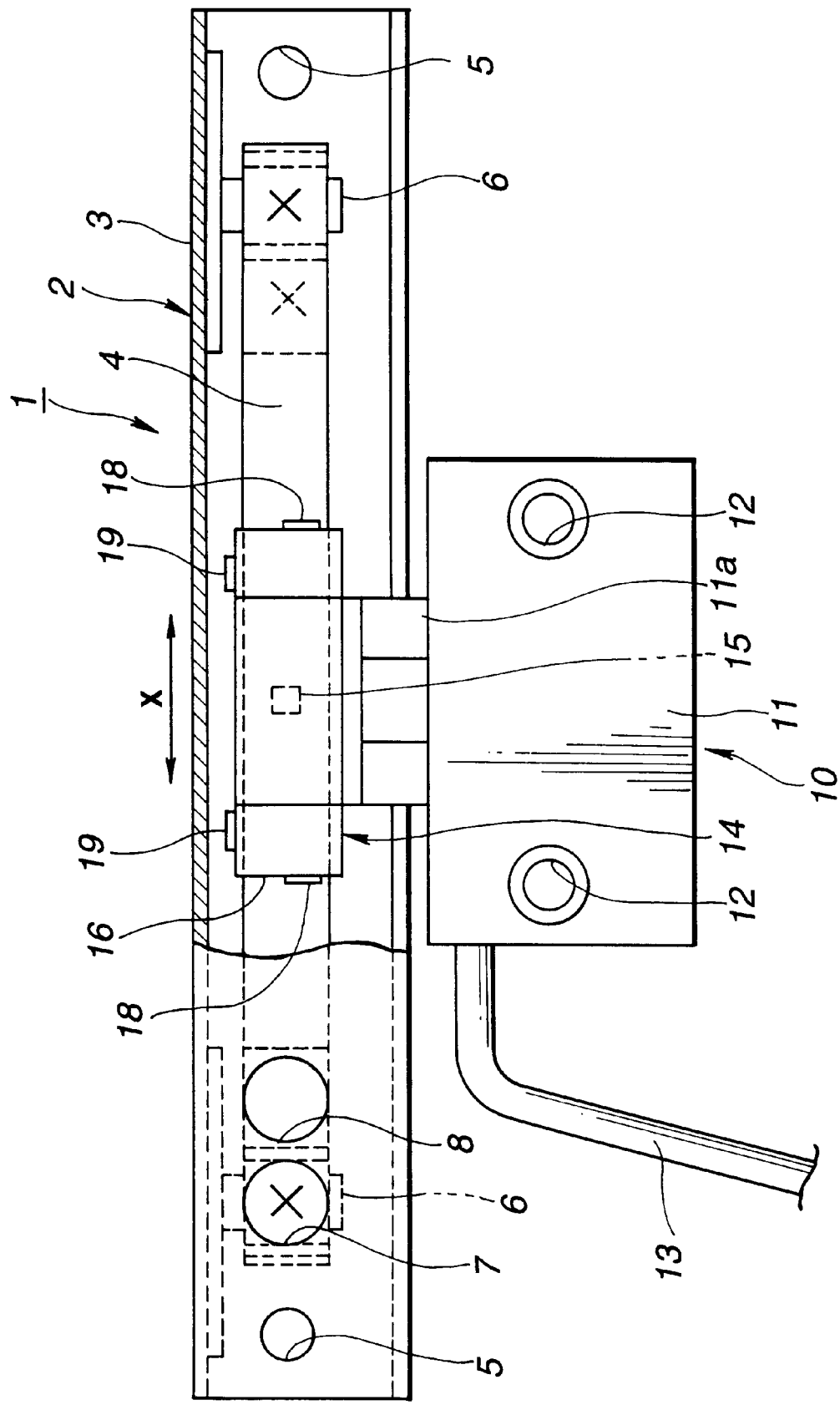
FIG. 2 is a front view showing the scale device shown in FIG. 1, with a portion of the casing being cut away.

The base unit 2 has an elongated thin-plate-like scale 4 formed of a metallic material in the inside of an elongated casing 3 as a main base portion, as shown in FIG. 2. The base unit 2 is secured by a bolt in a mounting hole 5 formed in the casing 3 to one end of an article under measurement. The slider unit 10 has a sensor 15 for detecting magnetic graduations recorded on the thin-plate-like scale 4 and is secured by bolting in a mounting hole 12 formed in the slider 11 for the movement relative to the article under measurement. The slider unit 10 is slid relative to the base unit 2 in the longitudinal direction of the thin-plate-like scale 4, in the direction indicated by arrow x in FIG. 2, in unison with the linear movement of the article under measurement, so that the magnetic graduations of the thin-plate-like scale 4 as detected by the sensor 15 are outputted over the cable 13 as electrical signals in order to detect the position of movement of the article under measurement.

In the scale device 1, the structure of the base unit 2 is explained in detail.

Figure 3:
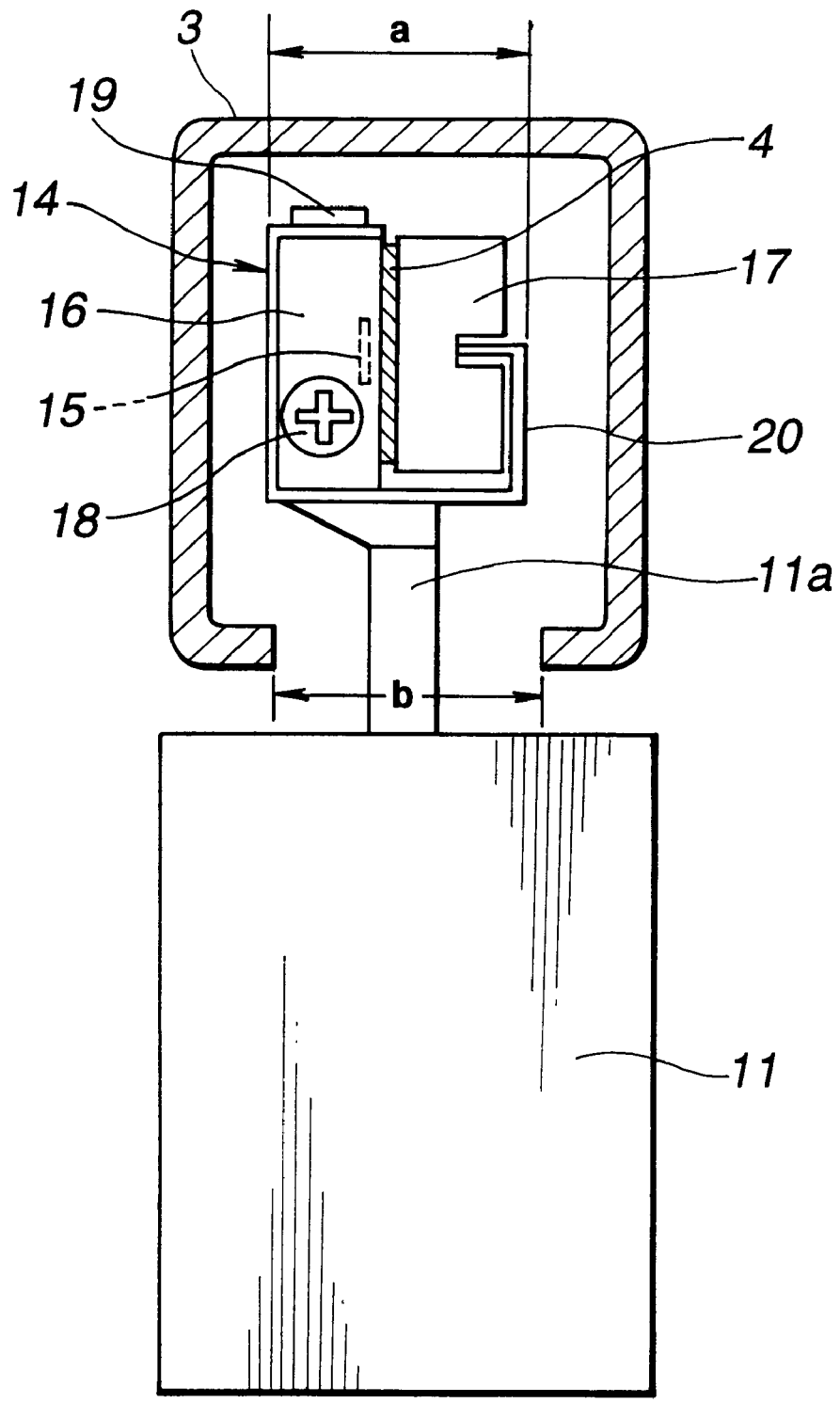
FIG. 3 is a side view of the scale device.

The casing 3, as a base member of the base unit 2, is an elongated member having a substantially U-shaped cross-section, as shown in FIG. 3, and is secured to the article under measurement in the mounting hole 5 with the open surface of the U-shape facing downwards. This casing 3 is formed of a metallic material of a pre-set toughness and may be molded by warping a metal plate or extrusion molding of a sheet metal. Of course, the casing 3 may be manufactured by machining.

The elongated thin-plate-like scale 4, secured to the inside of the casing 3, has magnetic graduations recorded along its length on the surface facing the sensor 15. These magnetic graduations may be of the incremental type in which magnetic N and S poles are recorded at a pre-set interval in the sequence of, for example, N-S, S-N, N-S , . . . or of the absolute type recording the absolute positions.

These magnetic graduations may be pre-recorded on the thin-plate-like scale 4 or recorded after securing the thin-plate-like scale 4 on the casing 3.

This thin-plate-like scale 4 is secured to the casing 3 at both longitudinal ends so that it is floated at its mid portion. That is, there are secured brackets at both longitudinal ends in the inside of the casing 3, as shown in FIG. 2. To this bracket 6 are welded both ends of the thin-plate-like scale 4. In FIG. 2, welds are indicated by marks X.

The thin-plate-like scale 4 is secured to the bracket 6 in an orientation such that the recording surface of the magnetic graduations is substantially perpendicular to the opening surface of the U-shape of the casing 3.

Figure 4:
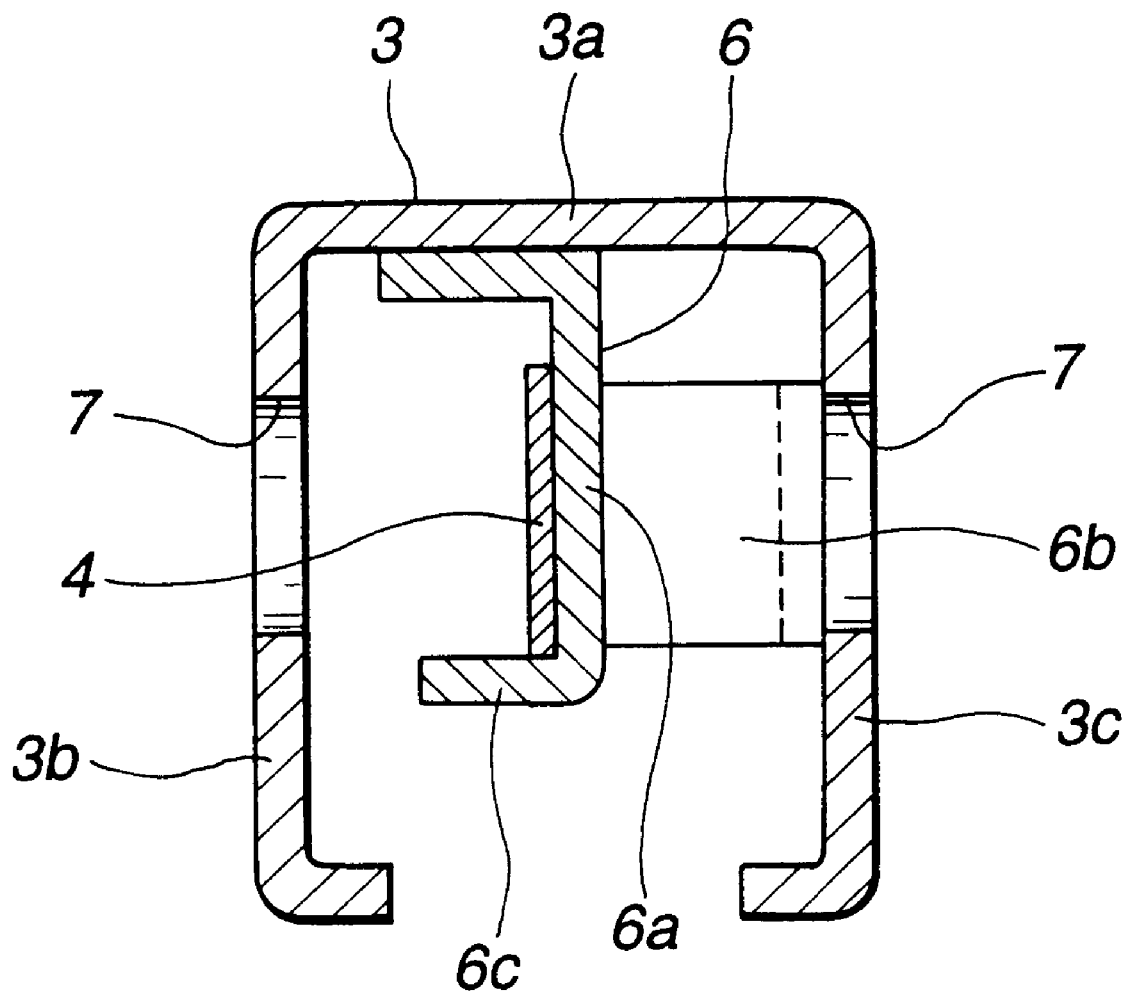
FIG. 4 is longitudinal cross-sectional view showing essential portions of a base unit of the scale device.

The bracket 6 is formed of a sheet metal of a pre-set toughness and is secured to the inner surface of an upper lateral plate 3a and to the inner surface of the rear side plate 3c of the casing 3, as shown in FIG. 4. An end of the thin-plate-like scale 4 is welded to a mid supporting plate section 6a of the bracket 6. The bracket 6 of the present embodiment is formed with a bend 6c operating as a scale support. The bend 6c as the scale support is used for positioning the thin-plate-like scale 4.

The thin-plate-like scale 4 is welded to the bracket 6 by resistance welding, preferably by spot welding. For this resistance welding, resistance electrodes 30a, 30b are inserted via insertion holes 7 formed in the upper lateral plate 3a and the rear side plate 3c of the casing 3, with the end of the thin-plate-like scale 4 set on the supporting plate section 6a of the bracket 6, so that the bracket 6 and the thin-plate-like scale 4 are sandwiched between the resistance electrodes 30a, 30b. The resistance electrodes 30a, 30b are then drawn close to each other and fed with the current in this state in order to weld the bracket 6 to the thin-plate-like scale 4.

This resistance welding is applied when welding the bracket 6 to the casing 3.

Figure 5:
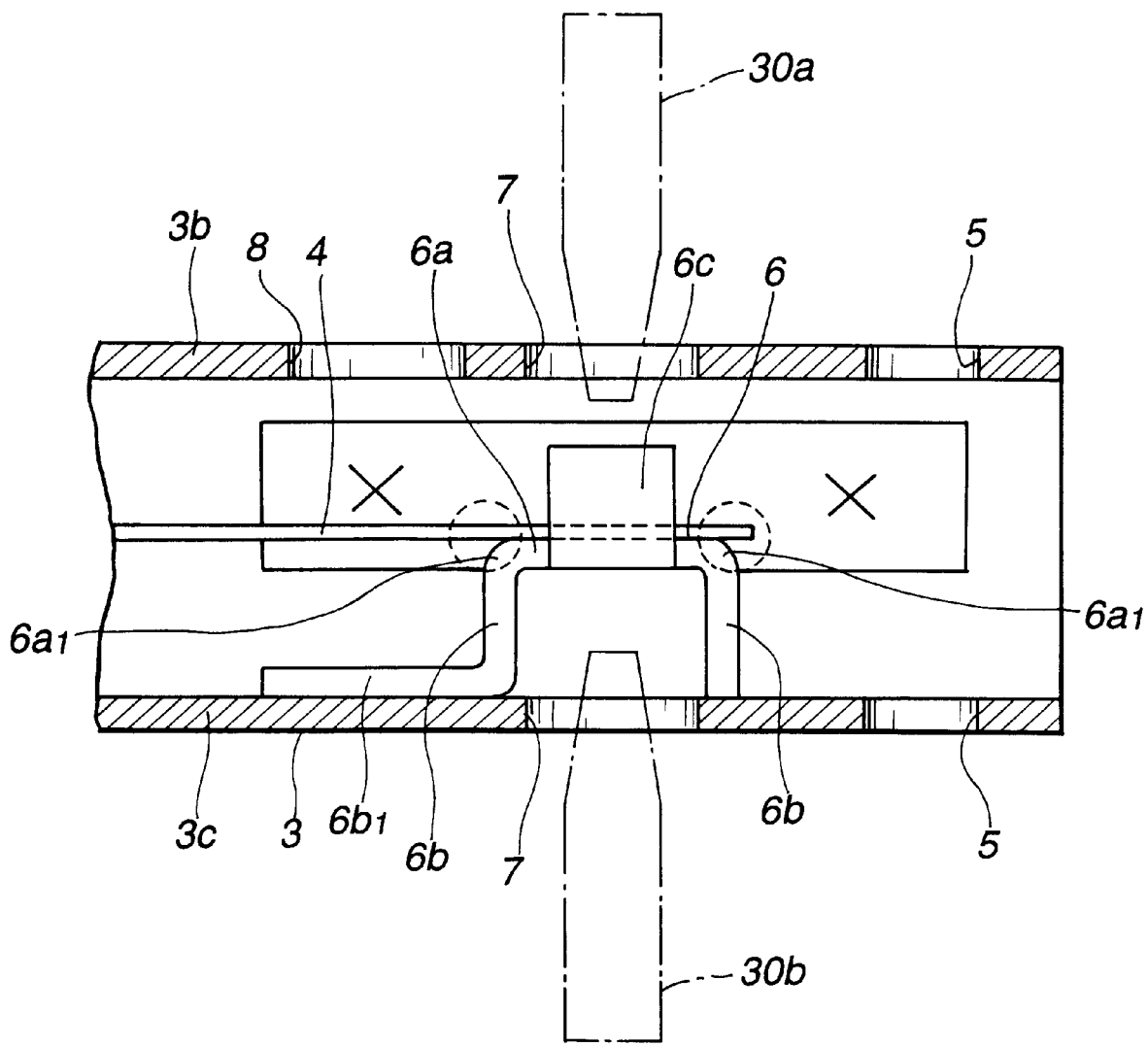
FIG. 5 is a longitudinal cross-sectional bottom view showing essential portions of the base unit.

The bracket 6 is formed with legs 6b on both sides of the supporting plate section 6a, to which the thin-plate-like scale 4 is secured, as shown in FIG. 5. These legs 6b are bent substantially at right angles to the supporting plate section 6a into abutment against the inner surface of the rear side plate 3c of the casing 3. The inner side leg 6b of the bracket 6 has an extension $6b_1$ bent and extended inwards, this extension $6b_1$ being welded to the inner surface of the rear side plate 3c of the casing 3. In a forward side plate section 3b of the casing 3 is formed an insertion hole 8 via which is inserted an electrode used for welding the extension $6b_1$ to the rear side plate 3c of the casing 3. Instead of welding the extension $6b_1$, the outer side leg 6b of the bracket 6 may also be secured, such as by a fillet weld, to the inner surface of the rear side plate 3c of the casing 3.

It is noted that both ends $6a_1$ (shown encircled by broken line in FIG. 5) of the supporting surface of the thin-plate-like scale 4 of the supporting plate section 6a of the bracket 6 have a rounded shape by having the leg 6b bent with respect to the supporting plate section 6a. This prevents the magnetic field from being concentrated on both ends of the supporting surface during the resistance welding to prevent the thin-plate-like scale 4 from being magnetized needlessly.

In the scale device 1 of the present embodiment, the thin-plate-like scale 4 is secured under tension to the bracket 6.

Figure 6A:
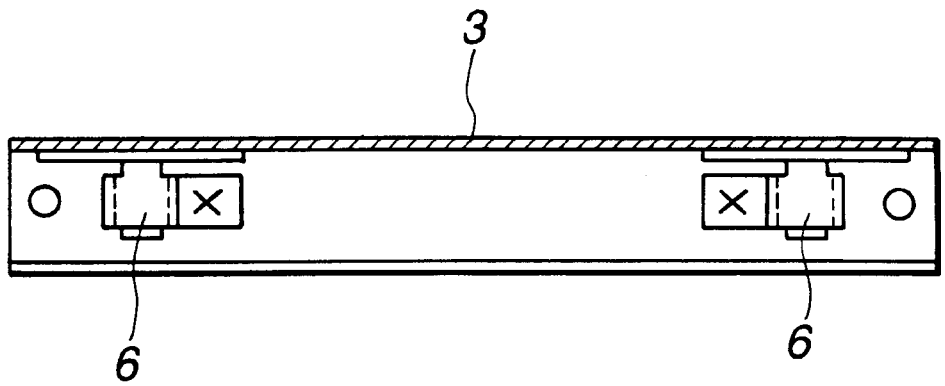
FIGS. 6A, 6B and 6C are front views of the base unit for illustrating the sequence of operations for securing the thin-plate-shaped scale to the base unit under tension.
Figure 6B:
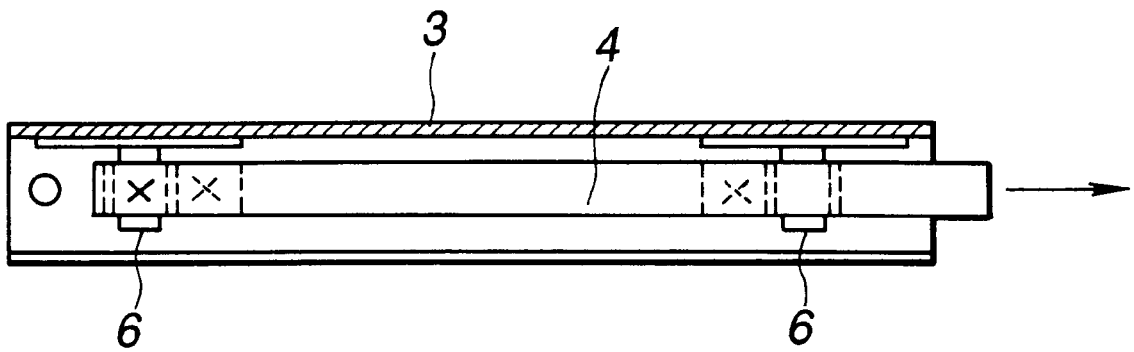
Figure 6C:
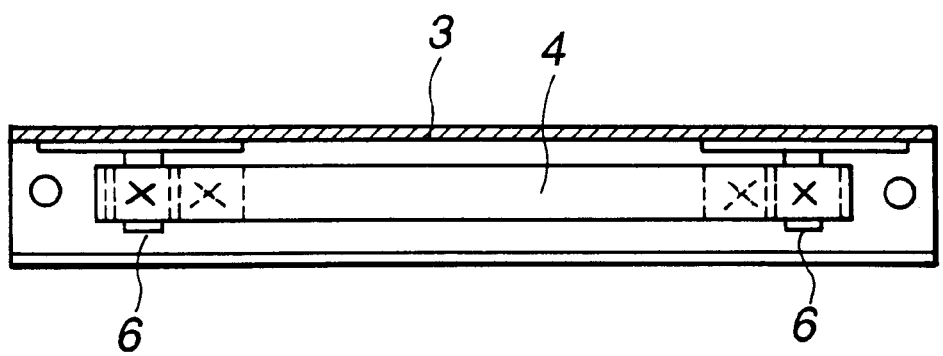

That is, when securing the thin-plate-like scale 4 to the bracket 6, the thin-plate-like scale 4 is welded from the state shown in FIG. 6A. In this case, the thin-plate-like scale 4 is welded only to one of the brackets 6, herein the left-side bracket 6, as shown in FIG. 6B. The right side end of the thin-plate-like scale 4 is clamped in this state and pulled for applying a pre-set tension. In this case, the thin-plate-like scale 4 is preferably formed with a redundant length to facilitate the clamping. With the tension applied in this manner to the thin-plate-like scale 4, the thin-plate-like scale 4 is welded to the right-side bracket 6. The redundant portion of the thin-plate-like scale 4 is then cut off, if necessary, to establish the completed state, as shown in FIG. 6C.

For clamping the thin-plate-like scale 4 to the bracket 6, both ends of the thin-plate-like scale 4 may be welded simultaneously to the brackets 6 under a state of clamping and tensioning both ends of the thin-plate-like scale 4.

Figure 10A:
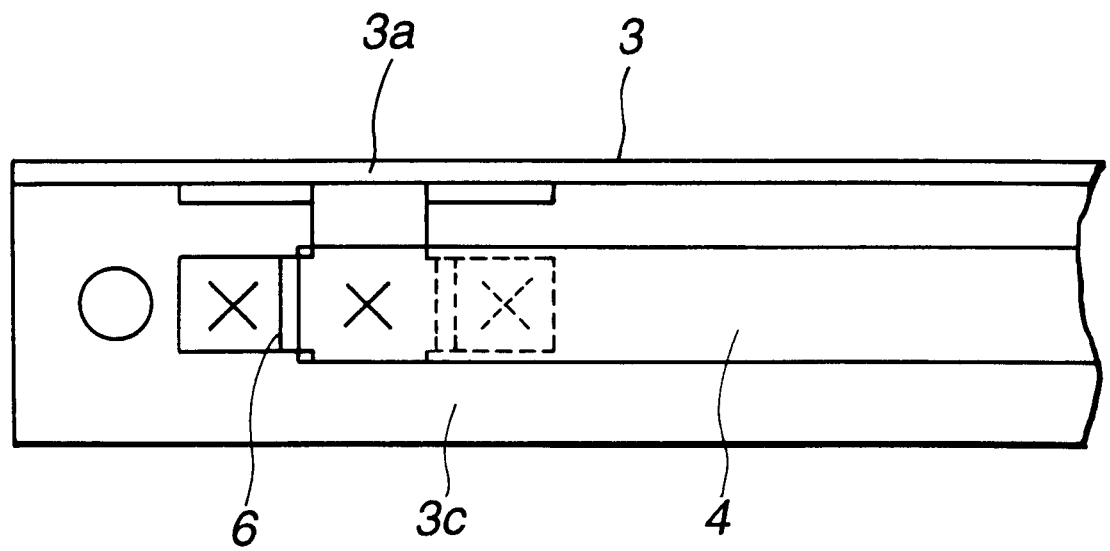
FIGS. 10A and 10B are a front view and a plan view, respectively, showing essential porticos of a typical base member of the base unit having a double-plane structure.
Figure 10B:
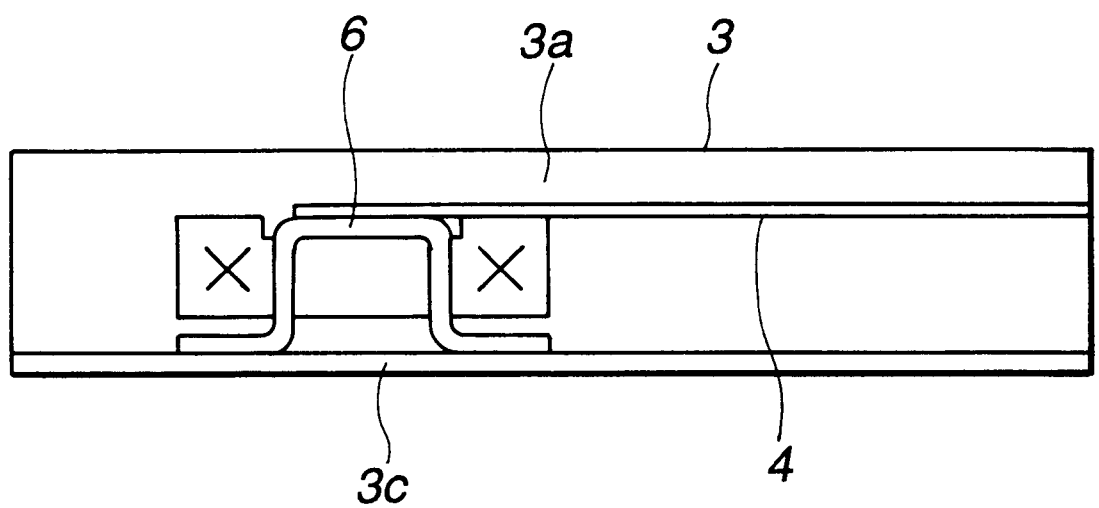

In the present embodiment, the scale device 1 is constructed using the casing 3 having the substantially U-shaped cross-section as the base member. Alternatively, a planar member having a unitary surface structure as shown in FIG. 7A or 7B and in FIGS. 8A to 8C or an L-shaped member having a double-surface structure as shown in FIGS. 10A and 10B may be used as a base member in place of the casing 3.

Figure 7A:
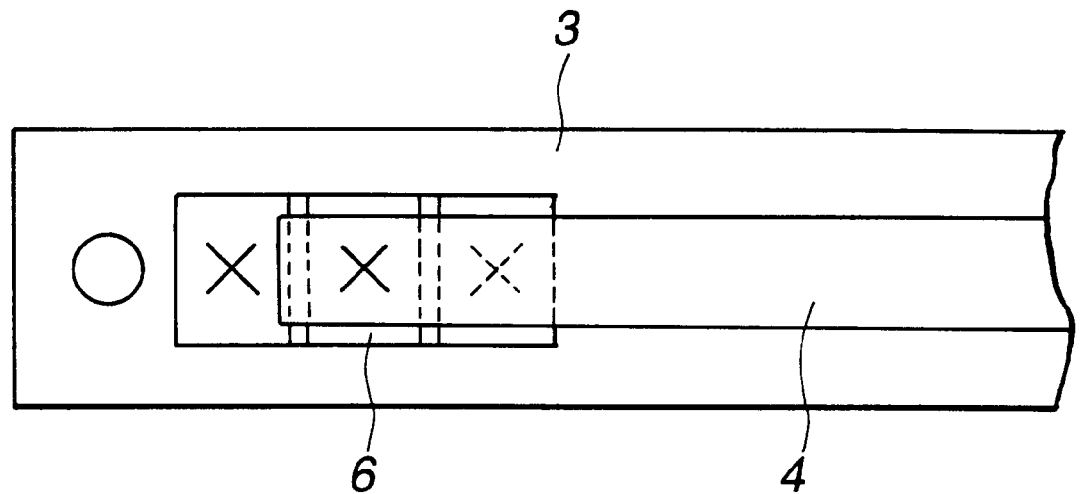
FIGS. 7A and 7B are a front view and a plan view, respectively, showing essential porticos of a typical base member of the base unit having a sole-plane structure.
Figure 7B:
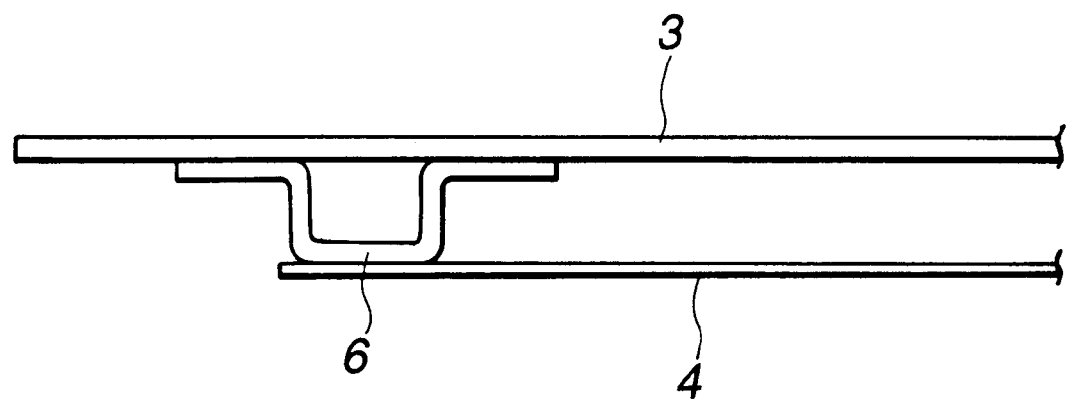

In an embodiment shown in FIGS. 7A and 7B, the planar member of the unitary surface structure is used as the base member 3. That is, to the base member 3 is welded the bracket 6, to which both ends of the thin-plate-like scale 4 are secured by welding. FIGS. 7A and 7B show the base member 3, to the bracket 6 of which the thin-plate-like scale 4 is welded, in a front view and in a plan view, respectively.

Figure 8A:
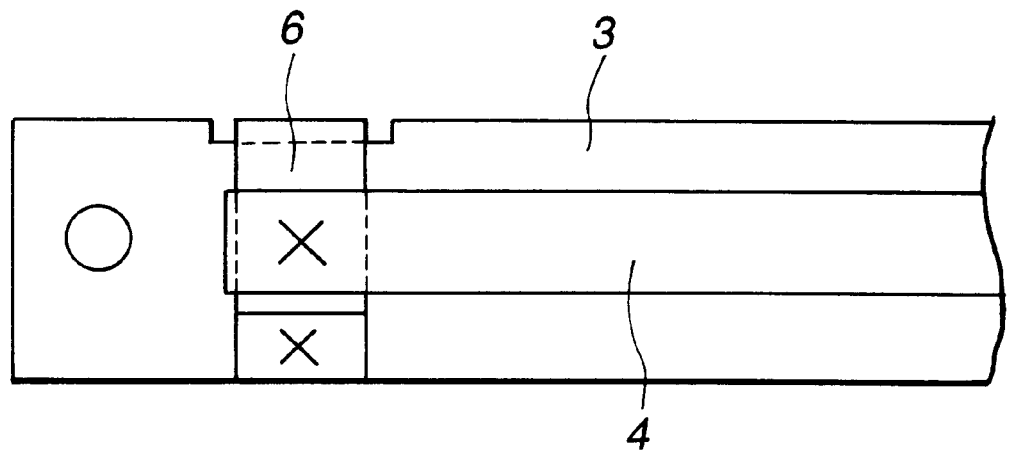
FIGS. 8A, 8B and 8C are a front view, a plan view and a cross-sectional side view, respectively, showing essential portions of a typical embodiment of the base member of the base unit having a sole-surface structure.
Figure 8B:
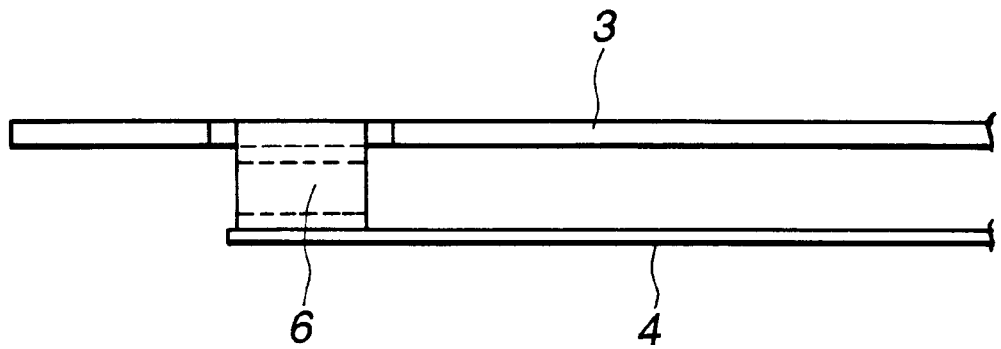
Figure 8C:
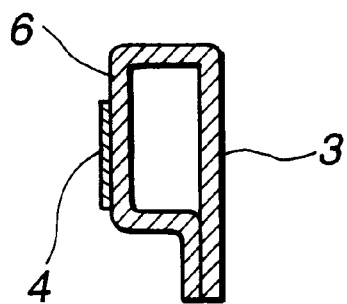

In the embodiment shown in FIGS. 8A to 8C, the planar member of the unitary surface structure is used as the base member 3. The bracket 6 is formed as-one with the base member 3, that is the bracket 6 is formed by a portion of the base member 3. To the bracket 6, both ends of the thin-plate-like scale 4 are secured by welding. In the embodiment shown in FIGS. 8A to 8C, the number of component parts and the number of the assembling steps can be reduced to assure further cost reduction. FIGS. 8A and 8B are a front view and a plan view, respectively, showing the thin-plate-like scale 4 welded to the bracket 6, while FIG. 8C shows a longitudinal cross-section of the portion of the bracket 6 unified to the base member 3.

Figure 9A:
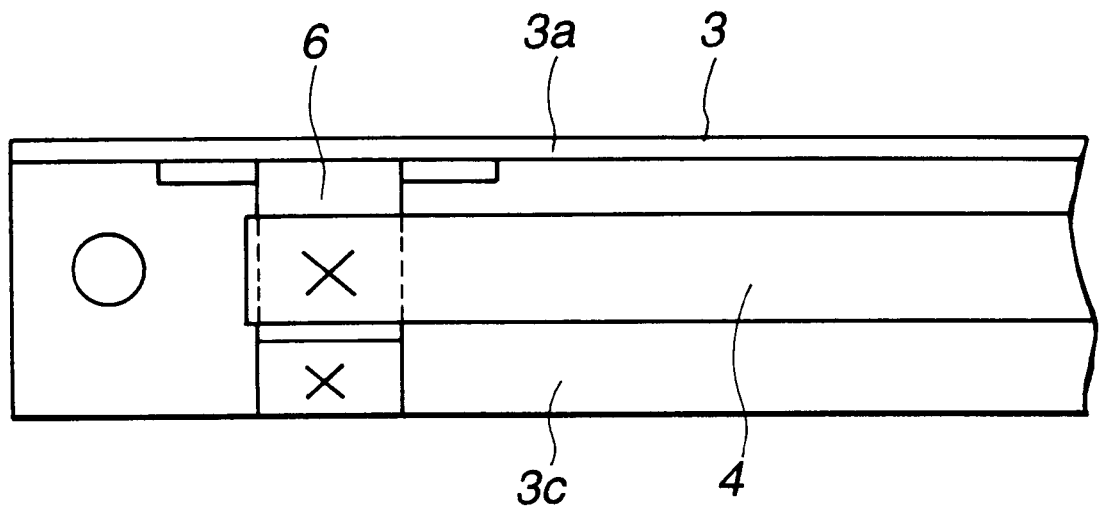
FIGS. 9A and 9B are a front view and a plan view, respectively, showing essential porticos a typical base member of the base unit having a sole-plane structure.
Figure 9B:
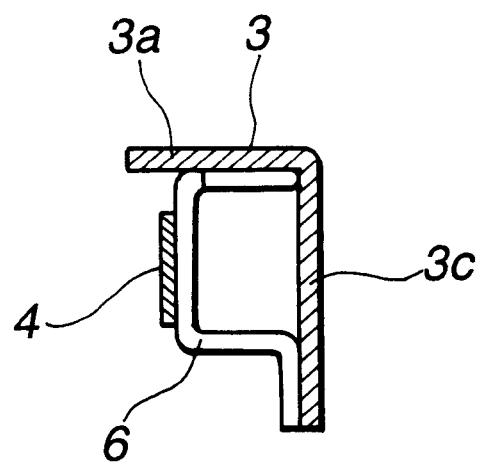

In an embodiment shown in FIGS. 9A and 9B, a bent member having the double-surface structure, that is an L-shaped member in cross-section, is used as the base member 3. The bracket 6 is secured by welding to the inner surfaces of the upper lateral plate 3a and the rear side plate 3c of the base member 3, and both ends of the thin-plate-like scale 4 are welded to the bracket 6. FIG. 9A shows the base member 3 to which is welded the thin-plate-like scale 4, in a front view, while FIG. 9B shows the bracket 6 in a longitudinal cross-sectional view.

In an embodiment shown in FIGS. 10A and 10B, a bent member having the double-surface structure, that is an L-shaped member in cross-section, is again used as the base member 3. The bracket 6 is secured by welding to the inner surfaces of the upper lateral plate 3a and the rear side plate 3c of the base member 3, and both ends of the thin-plate-like scale 4 are welded to the bracket 6. FIG. 10A shows the base member 3 to which is welded the thin-plate-like scale 4, in a front view, while FIG. 10B shows the bracket 6 in a longitudinal cross-sectional view.

Figure 11A:
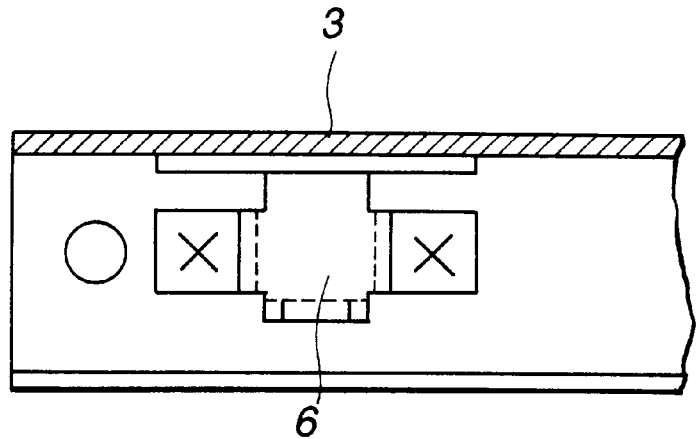
FIGS. 11A, 11B and 11C are a cross-sectional front view, a cross-sectional plan view and a cross-sectional side view, respectively, showing essential portions of a typical embodiment of the base member of the base unit having a sole-surface structure.
Figure 11B:
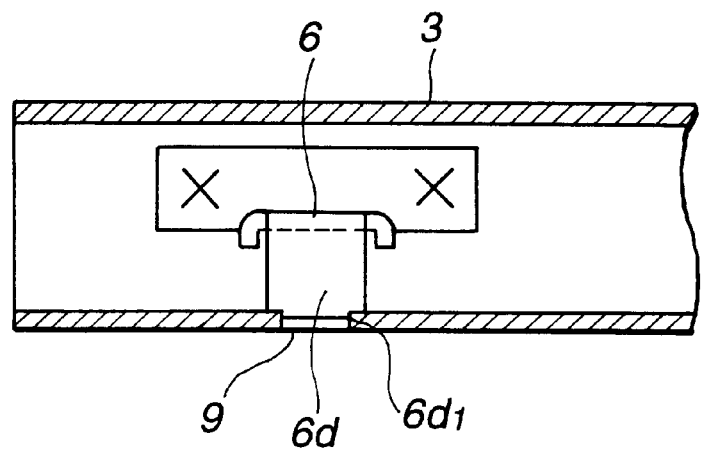
Figure 11C:
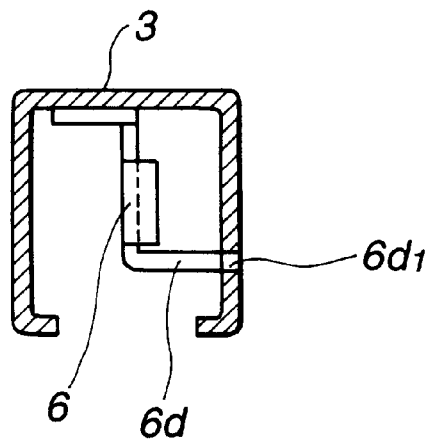

An illustrative reinforcement structure of the bracket 6 is shown in FIGS. 11A to 11C.

In the embodiment shown in FIGS. 11A to 11C, the end of the leg 6d of the bracket 6 is formed with a cut-out-like engagement portion $6d_1$ which is engaged in an engagement hole 9 formed in the casing 3 in order to prevent the bracket 6 from becoming warped by the tension which is induced after securing the thin-plate-like scale 4 to the bracket 6. FIGS. 11A and 11B show a longitudinal cross-sectional front view and a transverse cross-sectional bottom view of the casing with the thin-plate-like scale 4 welded to the bracket 6, respectively, while FIG. 11C shows the longitudinal cross-sectional side view of the bracket 6. In the present embodiment, the engagement portion $6d_1$ may be welded from outside the casing 3.

As means for securing the bracket 6 to the base member 3, set screws or caulking may be used in addition to or in place of welding.

Also, welding of the thin-plate-like scale 4 to the bracket 6 may also be by laser welding, such as YAG laser welding, or ultrasonic welding, in addition to or in place of resistance welding.

As means for securing the thin-plate-like scale 4, set screws or caulking may be used in addition to or in place of welding.

In the scale device 1 having the base unit 2 of the above-described structure, the base unit 2 can be constructed easily by securing the thin-plate-like scale 4 by securing both ends of the thin-plate-like scale 4 to the bracket 4 of the casing 3, with the mid portion of the thin-plate-like scale 4 in the floating state. Moreover, since no separate member is used for carrying the thin-plate-like scale 4, the scale device may be reduced in cost.

Also, with the present scale device 1, since the casing 3, bracket 6 and the thin-plate-like scale 4 are all welded in position, and the component parts of the base unit 2 are completely secured physically in position, there is caused no change in precision due to extraneous factors, such as changes in temperature or vibrations, so that there is provided the scale device having high reliability.

Moreover, with the present scale device 1, since the thin-plate-like scale 4 is secured by welding to the bracket 6 of the casing 3, there is no necessity of using tightening members, such as set screws, so that a smaller number of component parts suffices. In addition, the number of assembling steps can be reduced to contribute to further cost reduction.

In addition, since the thin-plate-like scale 4 is secured by welding to the bracket 6 of the casing 3, there is no risk of forming protuberances, such as heads of set screws, on the recording surface of the magnetic graduations of the thin-plate-like scale 4, so that, when securing the thin-plate-like scale 4 to the bracket 6 and subsequently recording magnetic graduations on the thin-plate-like scale 4, the recording magnetic head can be inserted into the casing via left and right side end openings of the casing 3 for recording.

In the present scale device 1, the thin-plate-like scale 4 is secured to the bracket 6 of the casing 3 under tension to suppress flexure of the thin-plate-like scale 4 so that a scale device may be provided which is further improved in accuracy.

If the casing 3 has temperature expansion coefficients different from those of the thin-plate-like scale 4, the casing 3 and the thin-plate-like scale 4 can be extended and contacted in unison against temperature changes by tensioning the thin-plate-like scale 4, in such a manner as to counterbalance the difference, thus eliminating error-inducing factors.

Furthermore, with the scale device 1, if the cross-section of the casing 3 is substantially U-shaped and the opened surface of the U-shape is directed downwards during use of the scale device 1, the thin-plate-like scale 4 is arranged substantially at right angles to the open surface of the casing 3, so that, if contaminants are intruded into the inside of the casing 3, these contaminants cannot be kept on the recording surface of the magnetic graduations of the thin-plate-like scale 4, thus perpetually assuring accurate position detection.

Since the flexure of the thin-plate-like scale 4 due to its own gravity can be reduced, position detection can be achieved in stability to high precision.

In the present scale device 1, since both ends $6a_1$ of the thin-plate-like scale 4 in the supporting plate section 6a of the bracket 6 are provided with a rounded shape, there is no risk of the thin-plate-like scale 4 being directly affected by the magnetic field generated in these ends $6a_1$ by the current flowing during resistance welding. Thus, even if the magnetic graduations are pre-formed on the thin-plate-like scale 4 or if the magnetic graduations are formed after welding the thin-plate-like scale 4, there is no risk of affecting the magnetic graduations thus assuring an optimum state of the scale device.

The rounded portions need only be provided at least on the inner sides of the bracket, that is on facing sides of the left and right brackets.

It suffices if the rounded portion is formed at least on the inner side of the bracket 6, that is on the facing side of left and right bracket portions.

Moreover, with the present scale device 1, sufficient toughness can be maintained by having the casing 3 substantially U-shaped in cross-section. In addition, since the bracket 6 is formed of sheet metal, it can be fabricated inexpensively even in small lots.

The structure of the slider unit 10 in the present scale device 1 is explained.

The slider unit 10 includes a slider 11, mounted below the casing 3, and a detection head unit 14 having a sensor 15 for detecting the magnetic graduations recorded on the thin-plate-like scale 4, as shown in FIGS. 1 and 2. The slider 11 and the detection head unit 14 are interconnected by a supporting plate 11a. That is, the supporting plate 11a is protuberantly formed on a mid portion on the upper surface of the slider 11 and the detection head unit 14 is mounted on the upper end of the supporting plate 11a.

The slider 11 has mounting holes 12 for mounting the slider for movement relative to the article being measured, and is secured to a device for movement relative to the article being measured by these mounting holes 12. From the slider 11 is led out a cable 13 by which the electrical signals detected by the sensor of the detection head unit 14 is outputted.

As the sensor 15 of the detection head unit 14, a magneto-resistance device (MR sensor) is used. This sensor 15 is secured by securing means, such as adhesion, caulking by fitting or thrusting by a plate spring, to the supporting plate 11a of the slider 11.

The detection head unit 14 includes a reference sliding member 16 and a pressing sliding member 17 for pressing the reference sliding member 16 so that the reference sliding member 16 will be contacted at all times with the recording surface of the magnetic graduations of the thin-plate-like scale 4.

The reference sliding member 16 and the pressing sliding member 17 are both block members formed of a lubricating resin material, such as Duracon (trade mark) or Teflon (trade mark), or oil-impregnated metal. The reference sliding member 16 is secured by a set screw 18 to the supporting plate 11a of the slider 11, while the pressing sliding member 17 is supported in pressure contact with the reference sliding member 16 by a plate spring 20 secured by a set screw 19 to the reference sliding member 16. The thin-plate-like scale 4 is sandwiched between the reference sliding member 16 and the pressing sliding member 17. By the pressing sliding member 17 perpetually pressing the thin-plate-like scale 4 against the reference sliding member 16, the sensor 16 is kept at all times at a constant distance from the recording surface of the magnetic graduations of the thin-plate-like scale 4.

With the present scale device 1, the slider 11 is slid relative to the casing 3 so that the detection head unit 14 is moved along the thin-plate-like scale 4. At this time, the magnetic gradations of the thin-plate-like scale 4 as detected by the sensor 15 are outputted over the cable 13 as electrical signals to detect the movement position.

Figure 12:
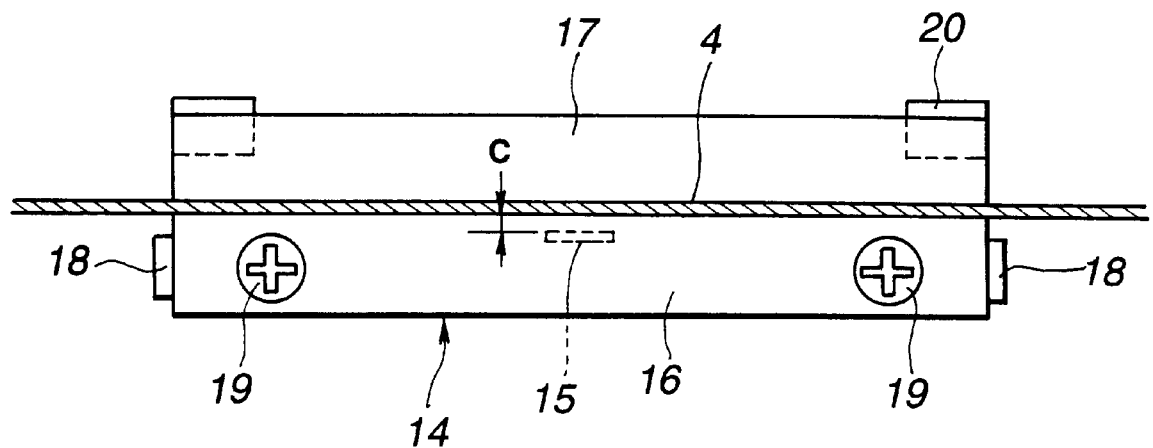
FIG. 12 is a plan view showing a detection head unit of the scale device.

In the scale device 1 of the present embodiment, the distance between the detection surface of the sensor 15 and the recording surface of the magnetic graduations of the thin-plate-like scale 4 (clearance C) is e.g., 0.35±0.25 mm in terms of the usable clearance range for the playback wavelength of 0.5 mm, if a magneto-resistance device is used as the sensor 15, as shown in FIG. 12. Therefore, if the clearance C is set at the center of the usable range and the reference sliding member 16 is mounted with the detection surface of the sensor 15 as the reference, it is sufficient if the thickness of the reference sliding member 16 is set to 0.35 mm.

Figure 13A:
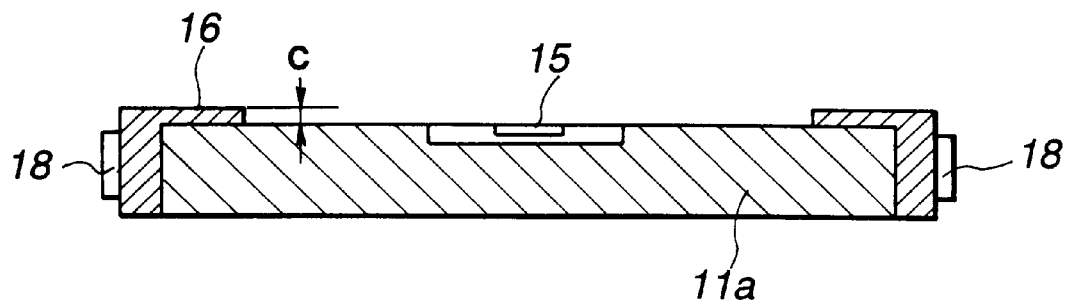
FIGS. 13A and 13B are longitudinal conventional front view showing an illustrative structure of a reference sliding member constituting the detection head unit.
Figure 13B:
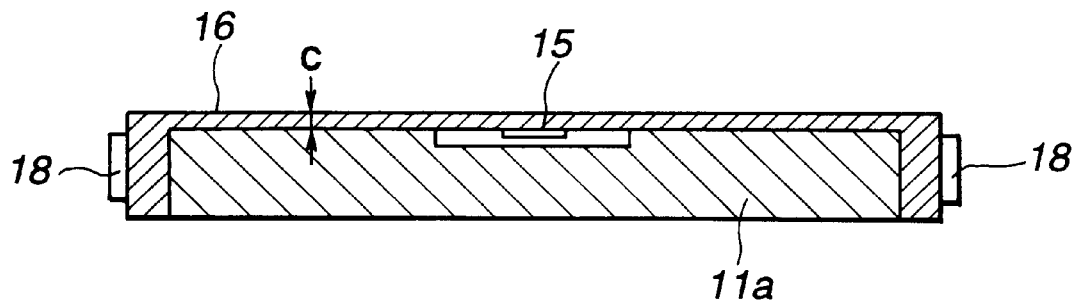

Meanwhile, the reference sliding member 16 may be of a structure opening the detection surface of the sensor 15, as shown in FIG. 13A, or a structure completely concealing the detection surface of the sensor 15, as shown in FIG. 13B.

In the above-described structure of the scale device 1, the detection head unit 14 can be telescopically moved along the width of the thin-plate-like scale 4.

That is, with the present scale device 1, the thin-plate-like scale 4 is arranged so that the recording surface of the magnetic graduations will be substantially perpendicular to the opening surface of the casing 3. In addition, the opening size b of the opening surface of the casing 3 is set so as to be larger than the thickness a of the detection head unit 14 so that the detection head unit 14 is telescopically movable in the direction of width of the thin-plate-like scale 4.

Since the detection head unit 14 is telescopically movable along the direction of width of the thin-plate-like scale 4, the detection head unit 14 can be assembled and detached from whichever portion along the position detection direction, that is along the length, of the thin-plate-like scale 4, thus assuring superior assembling and maintenance characteristics.

Figure 14:
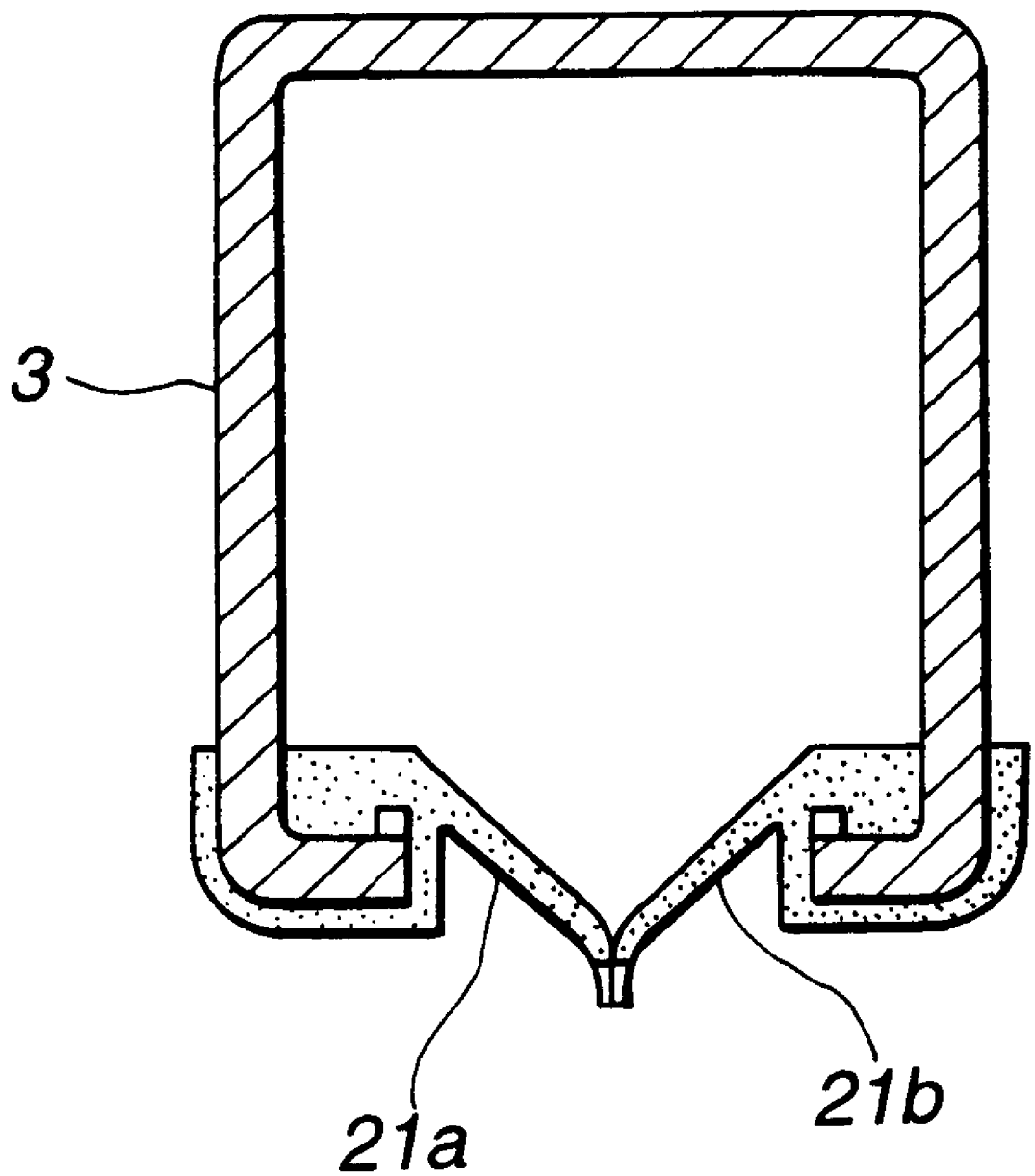
FIG. 14 is a longitudinal cross-sectional side view showing the state in which a dust trip is mounted on a casing of the scale device.

After assembling the detection head unit 14 on the thin-plate-like scale 4, dust trips 21a, 21b of rubber are mounted for stopping the opening surface of the casing 3, as shown in FIG. 14, for preventing intrusion of dust and dirt, oils or other contaminants into the casing 3 for protecting the detection head unit 14 and preventing the detection head unit 14 from being detached from the casing 3. When dismounting the detection head unit 14 for e.g., maintenance, it suffices to detach the dust trips 21a, 21b.

Usually, when mounting the casing 3 or the slider 11 on the article being measured in this type of the scale device, the mounting error is necessarily produced. The larger the allowance for this error, the easier is the mounting operation. In the present scale device 1, a sufficient allowance is assured.

Figure 15:
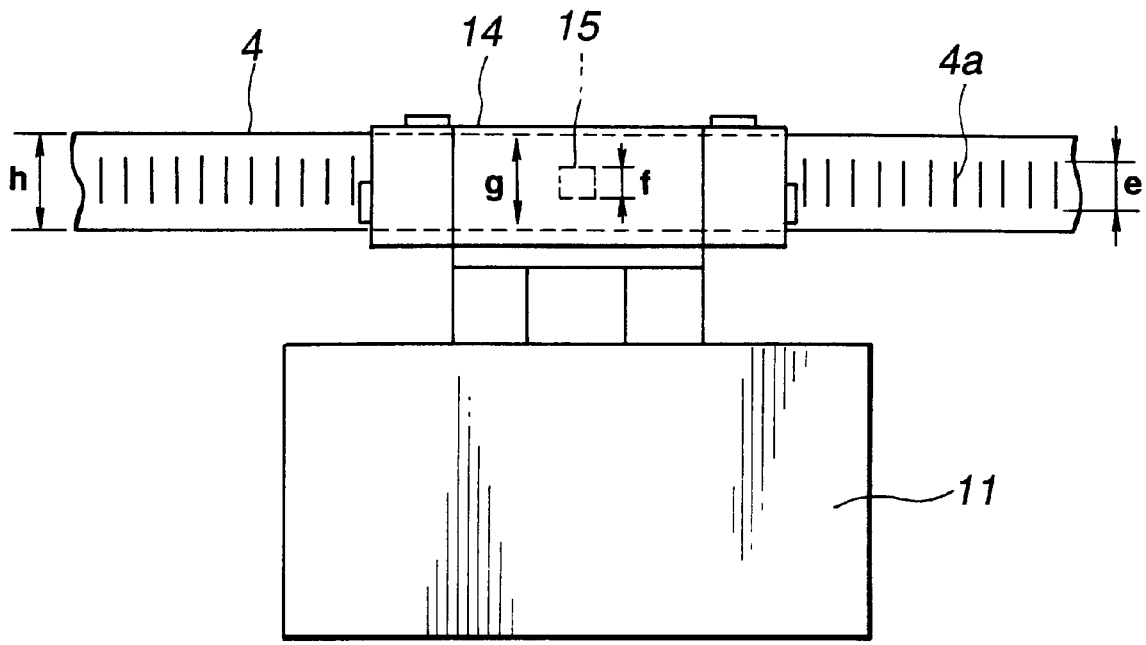
FIG. 15 is a front view showing essential portions for illustrating the allowable amount of the mounting error in the scale device.

That is, the magnetic graduations 4a of the thin-plate-like scale 4 are recorded as an elongated track along the width of the thin-plate-like scale 4, as shown in FIG. 15. If the track length e of the magnetic graduations 4a is selected to be larger than the length f along the track direction g (the direction perpendicular to the position detection direction) of the sensor 15, the difference represents the allowance for the mounting error of the track direction. Since the thin-plate-like scale 4 is sandwiched between the reference sliding member 16 and the pressing sliding member 17, the detection head unit 14 can be moved freely along the track direction.

If, for example, the width h of the thin-plate-like scale 4 is 9 mm, the track length e of the magnetic graduations 4a is 7 mm and the length f along the track direction of the sensor 15 is 3 mm, the allowance is ±2 mm, which is an extremely broad allowance range.

Figure 16:
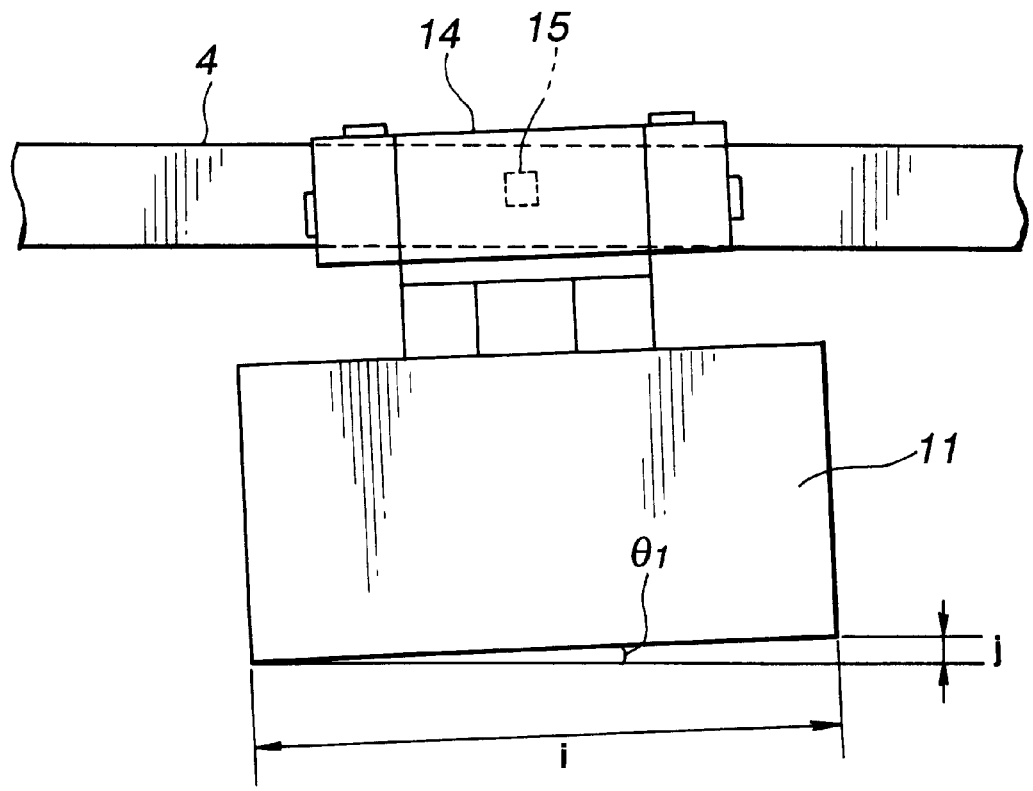
FIG. 16 is similarly a front view showing essential portions for illustrating the allowable amount of the mounting error in the scale device.

If the slider 11 is inclined at a tilt angle $\theta_1$, as shown in FIG. 16, such that the sensor 15 undergoes azimuth deflection relative to the magnetic graduations, the amount of tilt j is as large as 0.8 mm, which is a sufficient allowance value, if $\theta_1$ is 1° and the width i along the detection direction of the slider 11 is 50 mm. In the detection head unit 14, since the thin-plate-like scale 4 is sandwiched between the reference sliding member 16 and the pressing sliding member 17, the detection head unit 14 can be moved freely along the azimuth direction.

Figure 17:
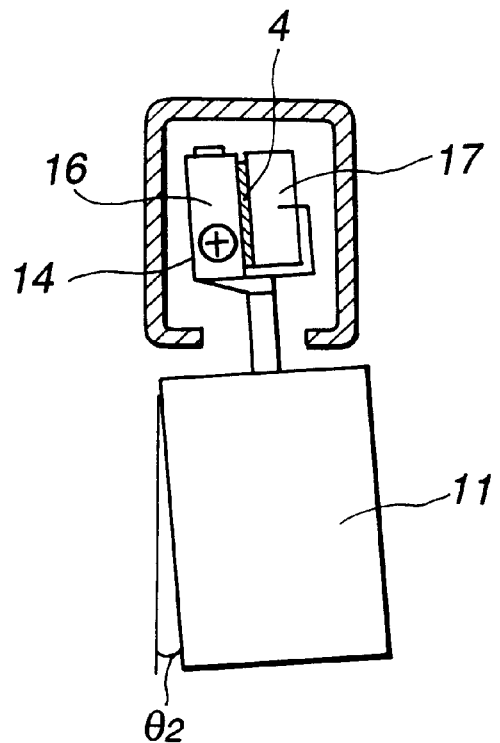
FIG. 17 is a side view showing essential portions for illustrating the allowable amount of the mounting error in the scale device.

When the slider 11 is subjected to position changes of the tilt angle of $\theta_2$, as shown in FIG. 17, the thin-plate-like scale 4 sandwiched between the reference sliding member 16 and the pressing sliding member 17 of the detection head unit 14 is twisted, so that the recording surface of the magnetic graduations is perpetually thrust against the reference sliding member 16 so as to follow up with the reference sliding member 16.

Figure 18:
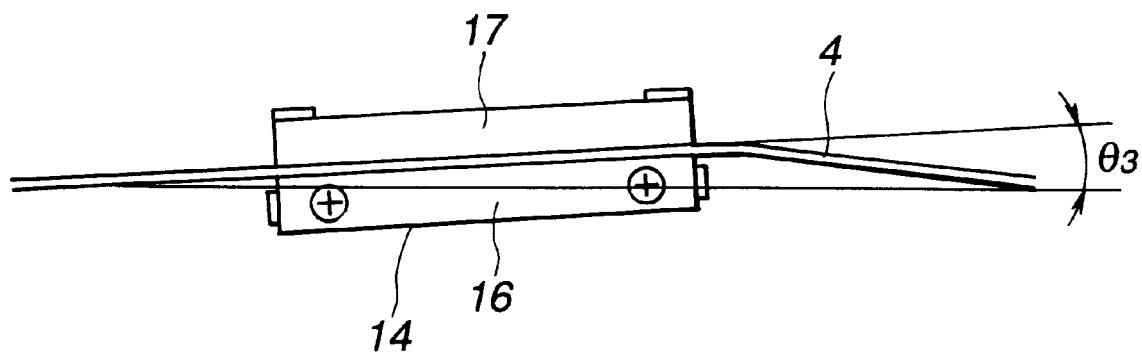
FIG. 18 is a plan view showing essential portions for illustrating the allowable amount of the mounting error in the scale device.

If the slider 11 is subjected to position changes with the tilt $\theta_3$ as shown in FIG. 18, the thin-plate-like scale 4 sandwiched between the reference sliding member 16 and the pressing sliding member 17 of the detection head unit 14 is flexed, so that the recording surface of the magnetic graduations is perpetually thrust against the reference sliding member 16 so as to follow up with the reference sliding member 16.

Thus, the present embodiment of the scale device 1 can accommodate any position changes by a simplified structure without providing a complicated universal mechanism for coping with position changes, while the allowance range moreover can be set to larger values.

Figure 19:
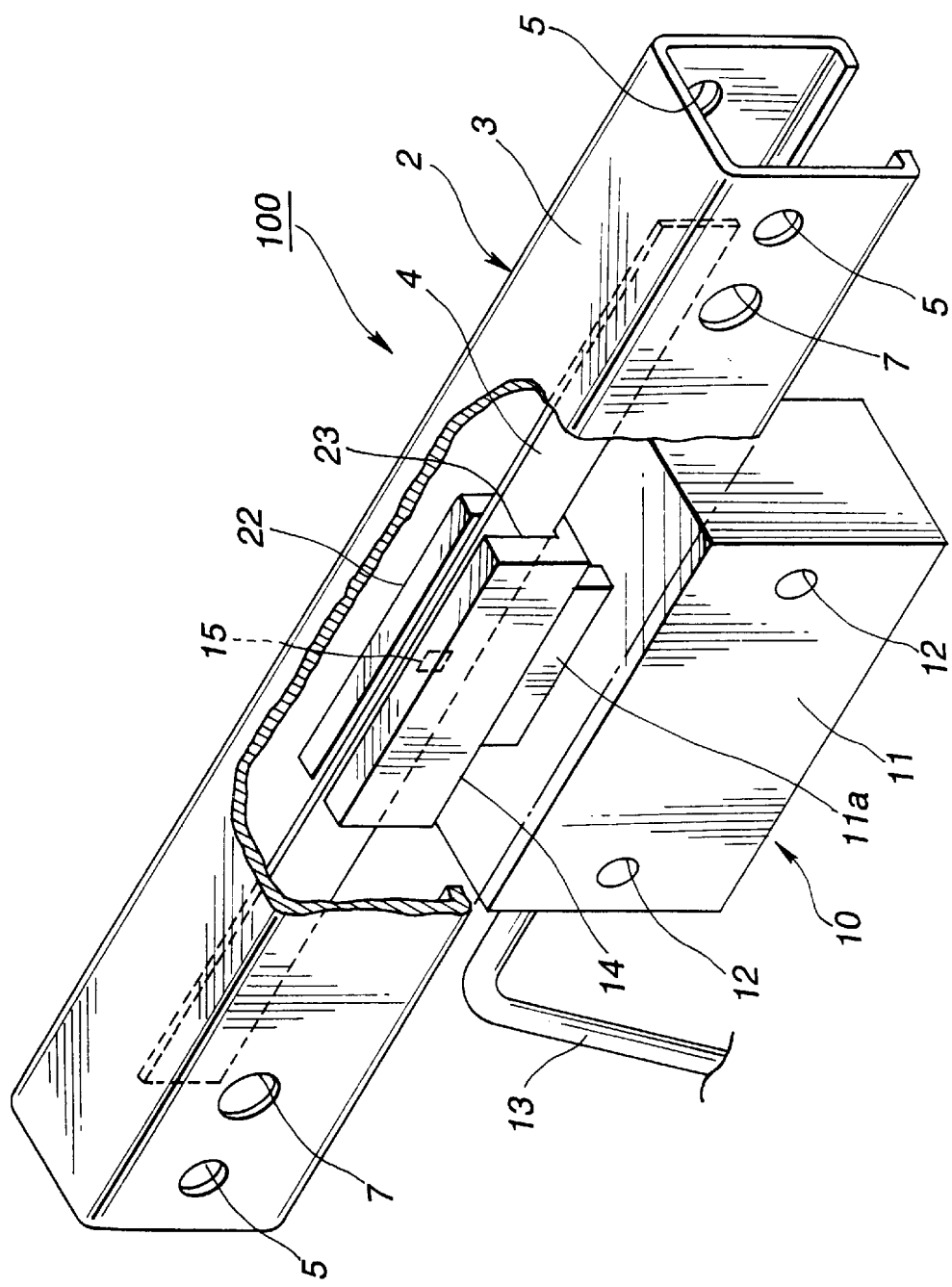
FIG. 19 is a perspective view showing a magnetic linear scale device of a modification of the present invention, with a portion of the casing being cut away.
Figure 20:
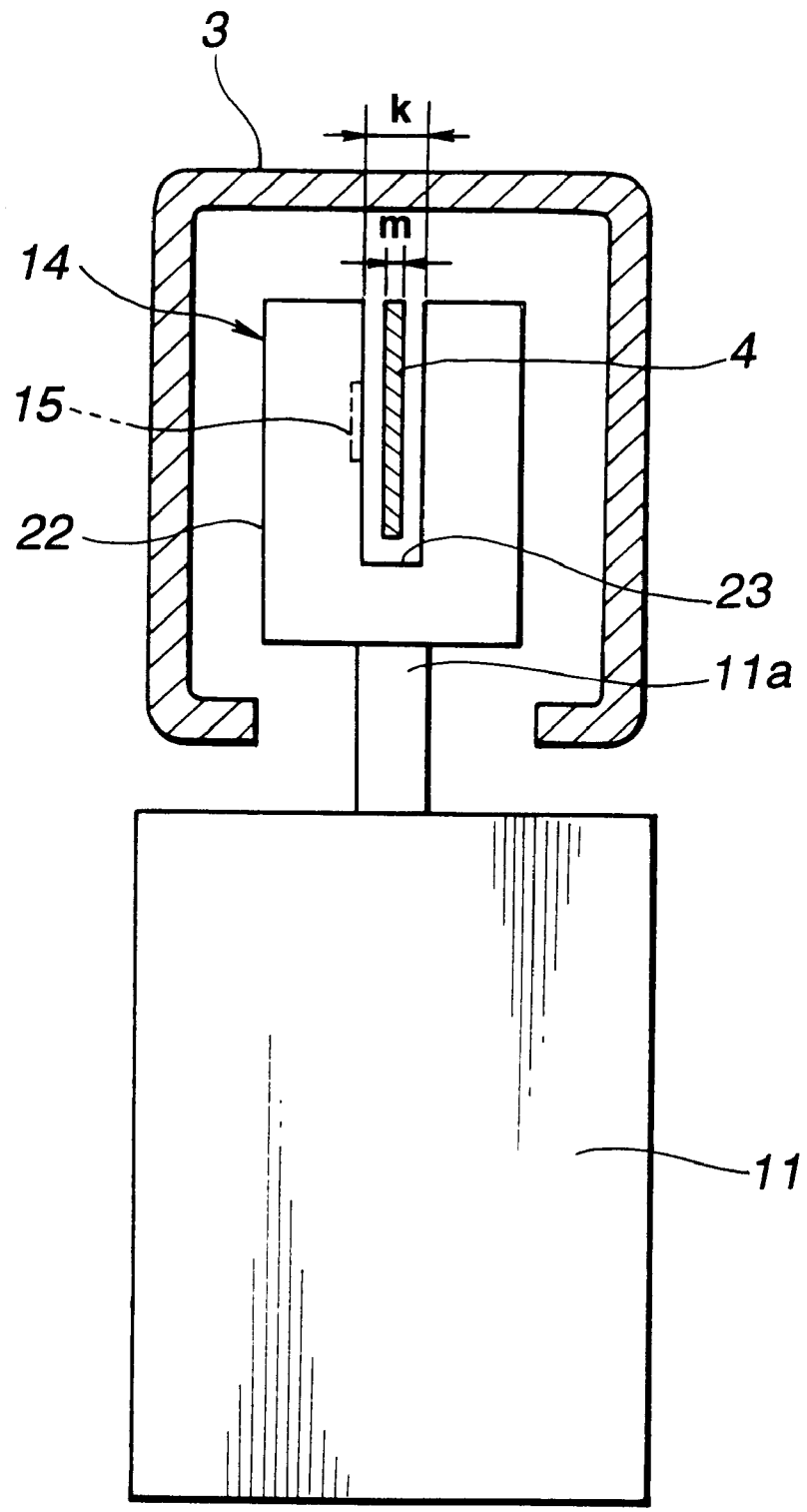
FIG. 20 is a side view showing the scale device shown in FIG. 19.

In the detection head unit 14 of the above-described scale device 1, the thin-plate-like scale 4 is sandwiched between the reference sliding member 16 provided with the sensor 15 and the pressing sliding member 17. Alternatively, the sensor 15 may be provided in a slider member 22 having a recess traversed by the thin-plate-like scale 4, as in a scale device 100 shown in FIGS. 19 and 20. In the scale device 100, shown in FIGS. 19 and 20, the parts or components which are the same as those of the scale device 1 are depicted by the same reference numerals and detailed description thereof is omitted for simplicity.

The slider member 22 is a block member formed of a lubricating resin material or oil-impregnated metal, and has a groove 23 traversed by the thin-plate-like scale 4. The function of the groove 23 formed in the slider member 22 is to maintain the distance between the sensor 15 and the recording surface of the magnetic graduations of the thin-plate-like scale 4, that is the clearance, within a range which allows for detection of the magnetic graduations by the sensor 15.

That is, in the detection head unit 14 in the present scale device 100, the sensor 15 is mounted facing the groove 23 formed in the slider member 22. The groove 23 has a width k which is larger than the thickness m of the thin-plate-like scale 4 and which is not larger than the sum of the thickness m of the thin-plate-like scale 4 and the maximum clearance allowing for detection of the magnetic graduations by the sensor 15.

If, with the use of a magneto-resistance device as the sensor 15, the maximum clearance allowing detection of the magnetic graduations for the reproducing wavelength of 0.5 mm, and the width k of the groove 23 is set so that $0.15 < k \leq 0.75$ mm, the clearance value within the range allowing for detection of the magnetic graduations by the sensor 15 is maintained at all times on passing the thinplate-like scale 4 in the groove 23, thus assuring regular position detection signals. If necessary, protection means may be provided on the sensor 15.

In the scale device 100 having the above-described detection head unit 14, the detection head unit 14 can be telescopically moved along the width of the thin-plate-like scale 4, as in the above-described scale device 1, while similar effects can be obtained for the allowance of the mounting error.

Figure 21:
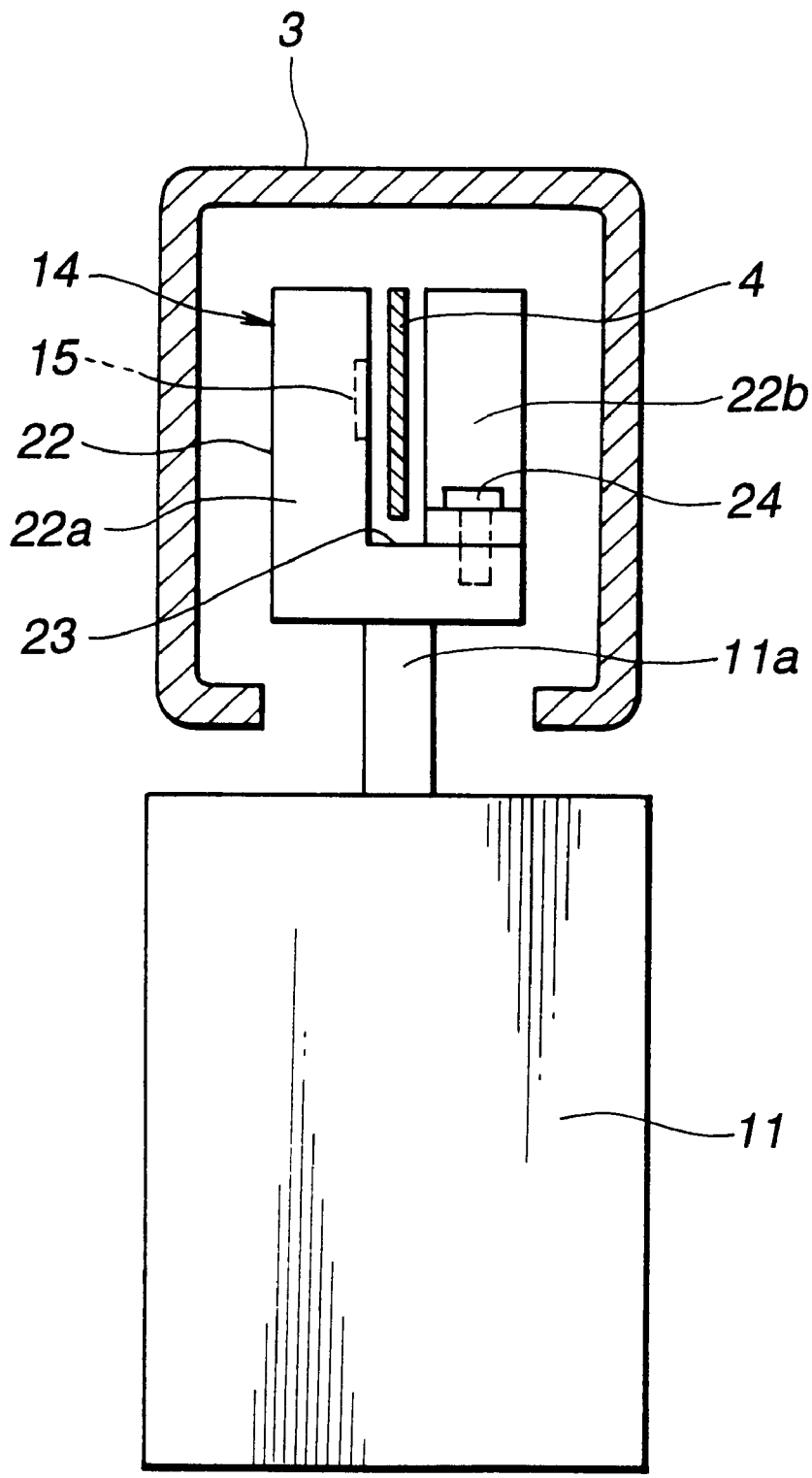
FIG. 21 is a side view showing a modification of a detection head unit in the scale device shown in FIG. 19.

The slider member 22 of the detection head unit 14 in the scale device 100 may be made up of two members, that is a main sliding member 22a and a subsidiary sliding member 22b, unified together by a set screw 24, as shown in FIG. 21.

Figure 22:
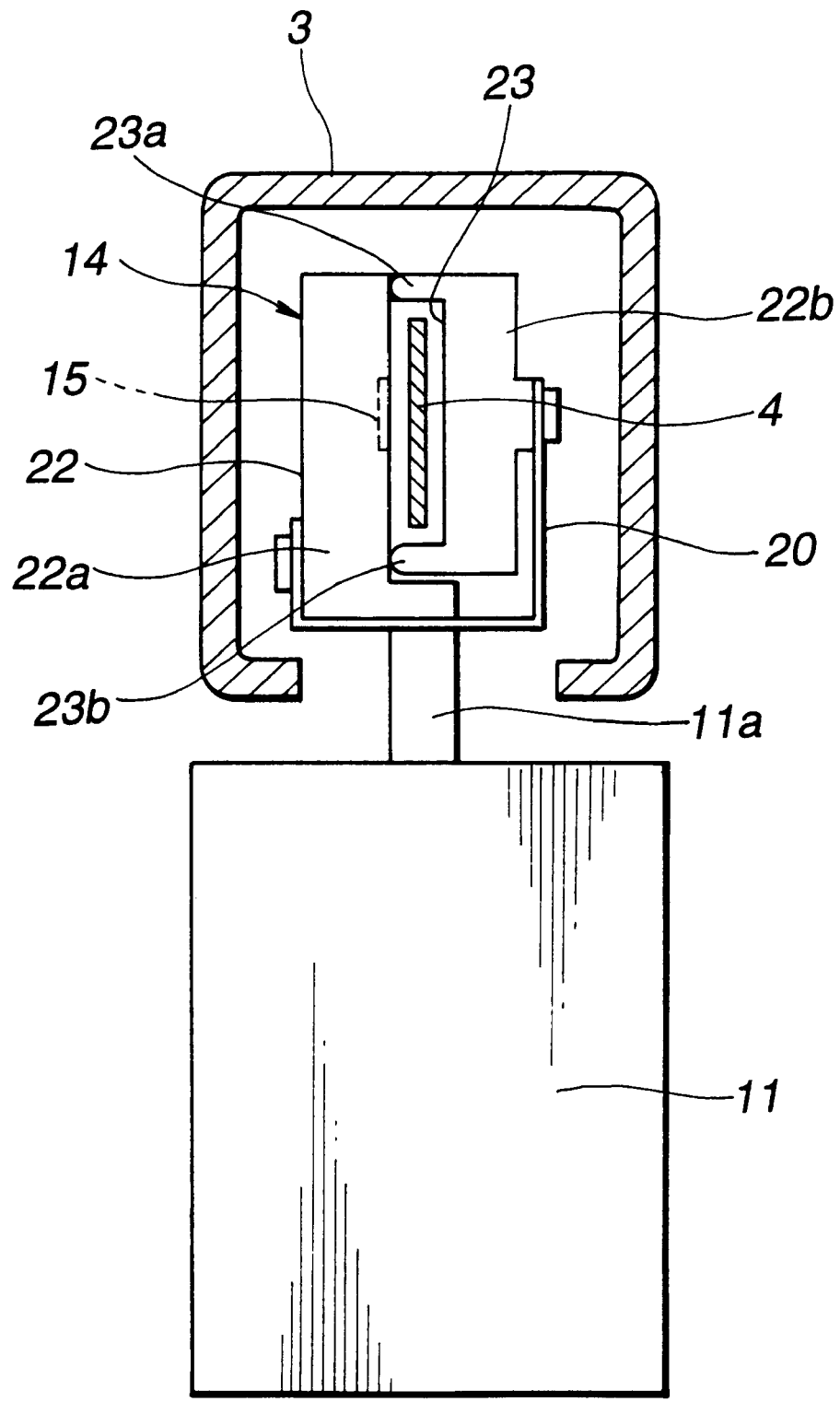
FIG. 22 is a side view showing another modification of the detection head unit.

Also, a slider member 22 of a structure in which the subsidiary sliding member 22b is supported by a plate spring 20 on the main sliding member 22a, as shown in FIG. 22, may also be used. The subsidiary sliding member 22b of the slider member 22 of FIG. 22 is formed with lugs 23a, 23b abutted against the main sliding member 22a above and below the sensor 15. The groove 23 traversed by the thin-plate-like scale 4 is formed between these lugs 23a, 23b.

If the slide member 22 is reduced in thickness for reducing the size of the detection head unit 14, the slide member 22 is reduced in toughness, such that, if the slider 11 is subjected to position changes with a tilt angle $\theta_2$, as shown in FIG. 17, the width k is enlarged, with the result that the clearance cannot be maintained in a pre-set range. Therefore, a reinforcing structure shown for example, in FIG. 23 may be used. That is, in the detection head unit 14, shown in FIG. 23, the subsidiary sliding member 22b, supported in a cantilever fashion by a set screw on the proximal end of a metal mounting substrate 22A provided on the distal end of the supporting plate 11a of the slider 11, is insufficient in toughness if reduced in thickness. Therefore, the subsidiary sliding member 22b is screwed to the proximal end along with a metal reinforcement plate 22B by a set screw for reinforcement. On the mounting substrate 22A, the main sliding member 22a, U-shaped in a plan view, is secured by set screws for encircling the sensor 15, as shown in FIG. 24 which is a plan view showing the reenforcement structure with the subsidiary sliding member 22b detached.

Figure 23:
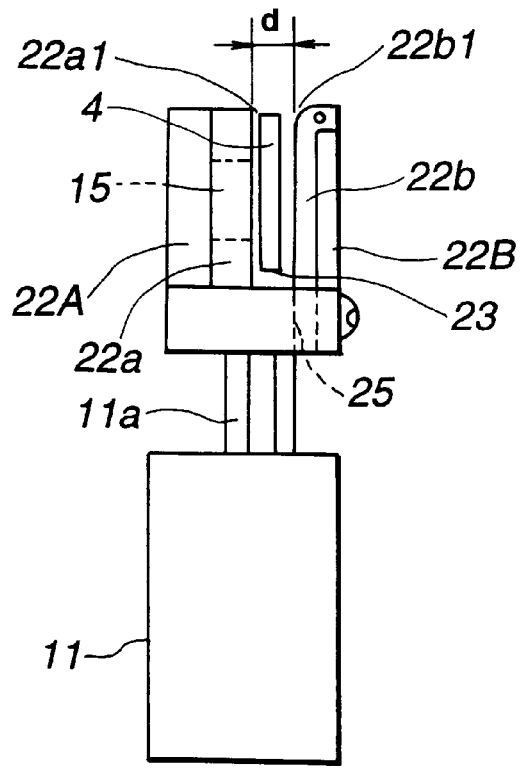
FIG. 23 is a side view showing an embodiment of a reinforcing structure in case the detection head unit shown in FIG. 21 is reduced in size.
Figure 24:
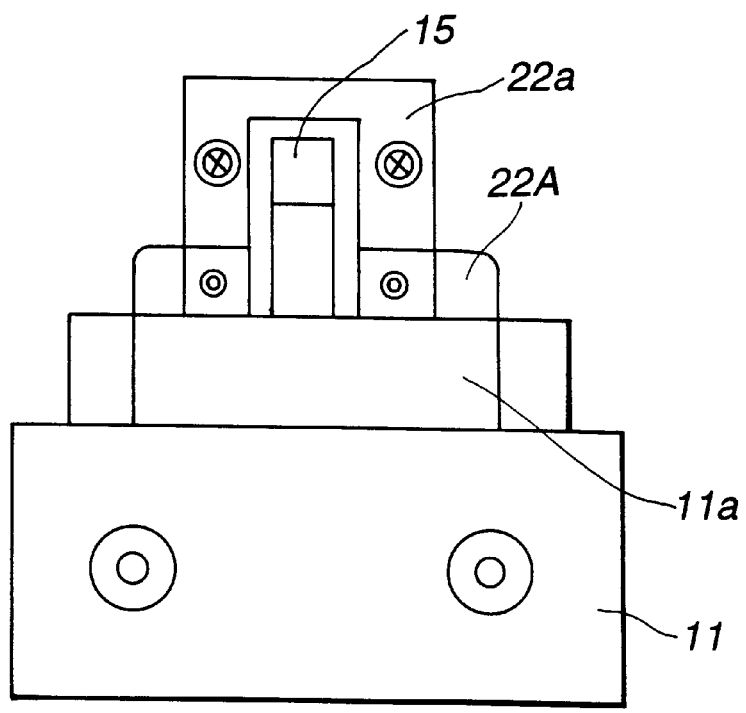
FIG. 24 is a plan view showing a subsidiary sliding member of the detection head unit shown in FIG. 23 dismounted.
Figure 25:
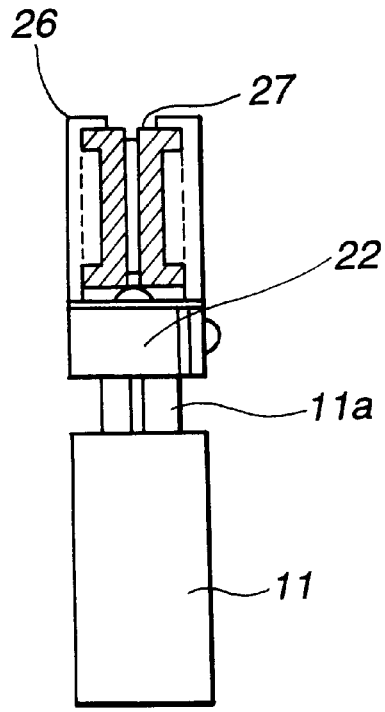
FIG. 25 is a side view of the detection head unit fitted with a wiper.

In the detection head unit 14, shown in FIG. 23, the width k of the groove 23 of the slide member 22 is set by the sizes of the metal reinforcement plate 22B, main sliding member 22a and the subsidiary sliding member 22b, such that, if the subsidiary sliding member 22b is once secured by a set screw, the width k can be adjusted by the spacer 25 interposed between the proximal end of the mounting base plate 22A and the subsidiary sliding member 22b.

Also, in the detection head unit 14, shown in FIG. 23, if the distal ends $22a_1$, $22b_1$ of the main sliding member 22a and the subsidiary sliding member 22b carrying the groove 23 of the slide member 22, in which the thin-plate-like scale 4 is fitted telescopically, are chamfered, the thin-plate-like scale 4 can be easily inserted into the groove 23. Meanwhile, if one of the distal ends $22a_1$, $22b_1$ of the main sliding member 22a and the subsidiary sliding member 22b carrying the groove 23 of the slide member 22, in which the thin-plate-like scale 4 is fitted telescopically, is chamfered, the thin-plate-like scale 4 can be easily inserted into the groove 23.

Figure 26:
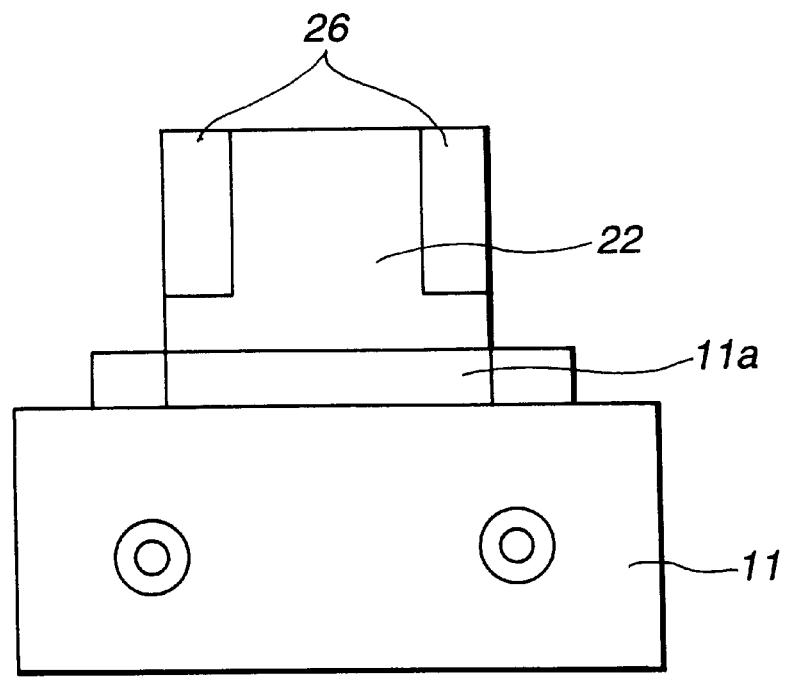
FIG. 26 is a plan view of the detection head unit shown in FIG. 25.
Figure 27:
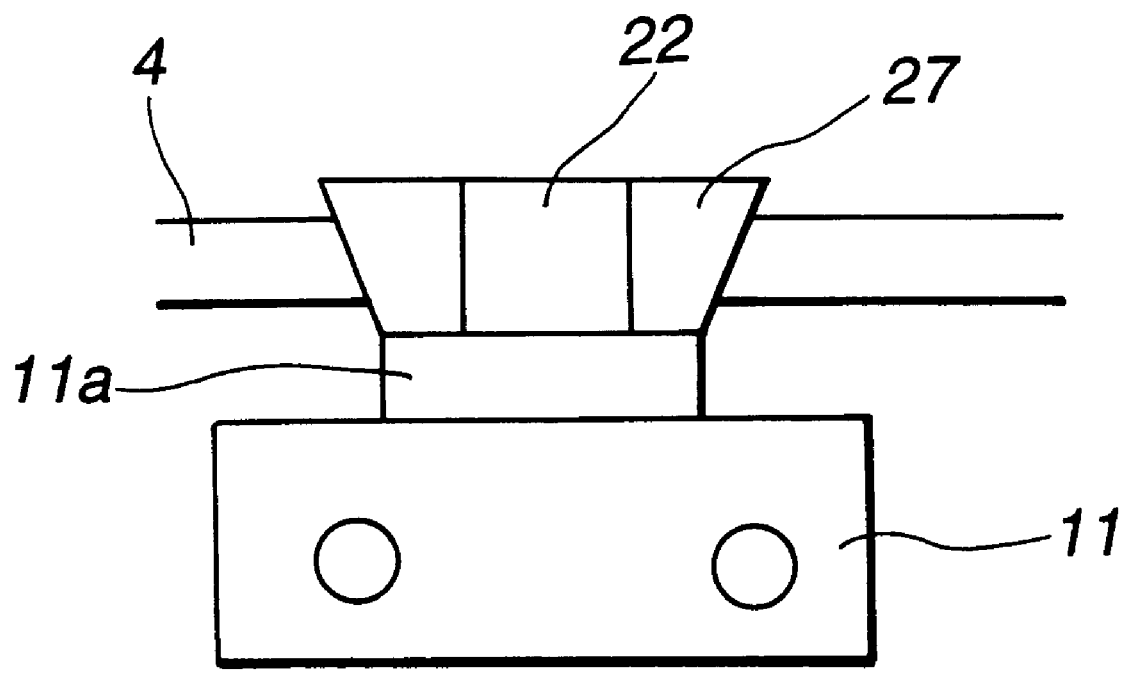
FIG. 27 is a plan view of the detection head unit showing a modification of the wiper.

In the detection head unit 14, a wiper 27 can be mounted on both ends of the slider member 22 by a wiper holder 25, 26 formed of an elastic metal plate, as shown in FIGS. 26 and 27. The wiper 27 is formed of felt or sponge rubber and is improved in lubricating properties by impregnation with oil. The wiper 27 an be easily exchanged by elastically deforming the wiper holder 16.

In the detection head unit 14, carrying the wiper 27 as described above, the dust and dirt affixed to the front and back surfaces of the thin-plate-like scale 4 traversing the groove may be removed by the wiper 27.

By tilting the lateral side of the wiper 27 with respect to the longitudinal direction of the thin-plate-like scale 4, as shown in FIG. 27, the dust and dirt removed from the surface of the thin-plate-like scale 4 by sliding can be removed by guiding out of the surface of the thin-plate-like scale 4 towards the open surface of the casing 3.

The wiper 27 can be mounted by the wiper holder 26 on the detection head unit 14 of a structure in which the thin-plate-like scale 4 is sandwiched by the reference sliding member 16 and the pressing sliding member 17.

It should be noted that the present invention can be applied not only to a magnetic scale device but to an optical scale device or a capacitance scale device irrespective of the particular system.

What is claimed is:

1. A scale device comprising:
    a base unit including a scale recorded with a plurality of magnetic graduations and secured to a main base member; and
    a slider unit adapted to slide relative to said base unit and including a detection head unit for detecting said plurality of magnetic graduations recorded on said scale, wherein
    said scale is formed as a thin plate scale having a first end and a second end secured to said main base member and a mid portion of said thin plate scale is in a suspended state,
    said detection head unit includes:
        a sensor,
        a reference sliding member for maintaining a constant distance between said sensor and a recording surface of said thin plate scale, and
        a pressing sliding member for pressing said thin plate scale against said reference sliding member, thereby sandwiching said thin plate scale between said reference sliding member and said pressing sliding member, and
    said detection head unit is removably attached to said thin plate scale by being adapted to slide in a direction along a width of said thin plate scale, thereby facilitating removal of said slider unit from said base unit.

2. The scale device as set forth in claim 1, wherein said thin plate scale is secured by welding to said main base member.

3. The scale device as set forth in claim 2, wherein said base unit further includes a bracket, and said thin plate scale is secured to said main base member by resistance-welding said thin plate scale to said bracket.

4. The scale device as set forth in claim 3, wherein said bracket is U-shaped having legs progressively removed from said thin plate scale.

5. The scale device as set forth in claim 1, wherein said thin plate scale is secured in a tensioned state on said main base member.

6. The scale device as set forth in claim 1, wherein said main base member comprises a U-shaped cross-section and said thin plate scale is secured to said main base member so that a recording surface of said plurality of magnetic graduations is substantially perpendicular to an open surface of said main base member.

7. A scale device comprising:
- a base unit including a scale recorded with a plurality of magnetic graduations and secured to a main base member; and
- a slider unit adapted to slide relative to said base unit and including a detection head unit for detecting said plurality of magnetic graduations recorded on said scale, wherein
- said scale is formed as a thin plate scale having a first end and a second end secured to said main base member and a mid portion of said thin plate scale is in a suspended state,
- said detection head unit includes:
  - a sensor, and
  - a sliding member having a groove for maintaining a distance between said sensor and a recording surface of said thin plate scale within a range allowing for detection of said plurality of magnetic graduations by said sensor, and
- said detection head unit is removably attached to said thin plate scale by being adapted to slide in a direction along a width of said thin plate scale, thereby facilitating the removal of said slider unit from said base unit.

* * * * *